United States Patent
Holz

(10) Patent No.: US 9,613,262 B2
(45) Date of Patent: Apr. 4, 2017

(54) OBJECT DETECTION AND TRACKING FOR PROVIDING A VIRTUAL DEVICE EXPERIENCE

(71) Applicant: Leap Motion, Inc., San Francisco, CA (US)

(72) Inventor: David S Holz, San Franciso, CA (US)

(73) Assignee: LEAP MOTION, INC., San Francisco, CA (US)

( * ) Notice: Subject to any disclaimer, the term of this patent is extended or adjusted under 35 U.S.C. 154(b) by 0 days.

(21) Appl. No.: 14/598,149

(22) Filed: Jan. 15, 2015

(65) Prior Publication Data

US 2015/0199025 A1 Jul. 16, 2015

Related U.S. Application Data

(60) Provisional application No. 61/927,919, filed on Jan. 15, 2014.

(51) Int. Cl.
*G06K 3/00* (2006.01)
*G06K 9/00* (2006.01)
(Continued)

(52) U.S. Cl.
CPC .......... *G06K 9/00355* (2013.01); *G06F 3/011* (2013.01); *G06F 3/043* (2013.01);
(Continued)

(58) Field of Classification Search
CPC .......... G06F 2203/04106; G06F 3/011; G06F 3/0425
See application file for complete search history.

(56) References Cited

U.S. PATENT DOCUMENTS 2,665,041 A 1/1954 Maffucci
4,175,862 A 11/1979 DiMatteo et al.
(Continued)

FOREIGN PATENT DOCUMENTS

CN 1984236 A 6/2007
CN 101478671 A 7/2009
(Continued)

OTHER PUBLICATIONS

U.S. Appl. No. 14/149,709—Non Final Office Action dated Mar. 9, 2016, 70 pages.
(Continued)

*Primary Examiner* — Andrew Sasinowski
*Assistant Examiner* — Chun-Nan Lin
(74) *Attorney, Agent, or Firm* — Haynes Beffel & Wolfeld LLP; Ernest J. Beffel, Jr.

(57) ABSTRACT

The technology disclosed can provide capabilities such as using vibrational sensors and/or other types of sensors coupled to a motion-capture system to monitor contact with a surface that a user can touch. A virtual device can be projected onto at least a portion of the surface. Location information of a user contact with the surface is determined based at least in part upon vibrations produced by the contact. Control information is communicated to a system based in part on a combination of the location on the surface portion of the virtual device and the detected location information of the user contact. The virtual device experience can be augmented in some implementations by the addition of haptic, audio and/or visual projectors.

19 Claims, 14 Drawing Sheets

(51) Int. Cl.
*G06F 3/01* (2006.01)
*G06F 3/042* (2006.01)
*G06F 3/043* (2006.01)
*G06K 9/20* (2006.01)

(52) U.S. Cl.
CPC ........... *G06F 3/0425* (2013.01); *G06K 9/209* (2013.01); *G06K 9/2018* (2013.01); *G06F 2203/04106* (2013.01)

(56) References Cited

U.S. PATENT DOCUMENTS

| | | | |
|---|---|---|---|
| 4,879,659 A | 11/1989 | Bowlin et al. | |
| 5,134,661 A | 7/1992 | Reinsch | |
| 5,282,067 A | 1/1994 | Liu | |
| 5,434,617 A | 7/1995 | Bianchi | |
| 5,454,043 A | 9/1995 | Freeman | |
| 5,455,561 A | 10/1995 | Brown | |
| 5,574,511 A | 11/1996 | Yang et al. | |
| 5,581,276 A | 12/1996 | Cipolla et al. | |
| 5,594,469 A | 1/1997 | Freeman et al. | |
| 5,691,737 A | 11/1997 | Ito et al. | |
| 5,742,263 A | 4/1998 | Wang et al. | |
| 5,900,863 A | 5/1999 | Numazaki | |
| 5,940,538 A | 8/1999 | Spiegel et al. | |
| 6,002,808 A | 12/1999 | Freeman | |
| 6,031,161 A | 2/2000 | Baltenberger | |
| 6,031,661 A | 2/2000 | Tanaami | |
| 6,072,494 A | 6/2000 | Nguyen | |
| 6,075,895 A | 6/2000 | Qiao et al. | |
| 6,147,678 A | 11/2000 | Kumar et al. | |
| 6,154,558 A | 11/2000 | Hsieh | |
| 6,181,343 B1 | 1/2001 | Lyons | |
| 6,184,326 B1 | 2/2001 | Razavi et al. | |
| 6,184,926 B1 | 2/2001 | Khosravi et al. | |
| 6,195,104 B1 | 2/2001 | Lyons | |
| 6,204,852 B1 | 3/2001 | Kumar et al. | |
| 6,252,598 B1 | 6/2001 | Segen | |
| 6,252,968 B1 * | 6/2001 | Narasimhan | H04R 29/00 381/102 |
| 6,263,091 B1 | 7/2001 | Jain et al. | |
| 6,417,970 B1 | 7/2002 | Travers et al. | |
| 6,492,986 B1 | 12/2002 | Metaxas et al. | |
| 6,493,041 B1 | 12/2002 | Hanko et al. | |
| 6,498,628 B2 | 12/2002 | Iwamura | |
| 6,578,203 B1 | 6/2003 | Anderson, Jr. et al. | |
| 6,603,867 B1 | 8/2003 | Sugino et al. | |
| 6,661,918 B1 | 12/2003 | Gordon et al. | |
| 6,674,877 B1 | 1/2004 | Jojic et al. | |
| 6,702,494 B2 | 3/2004 | Dumler et al. | |
| 6,734,911 B1 | 5/2004 | Lyons | |
| 6,798,628 B1 | 9/2004 | Macbeth | |
| 6,804,654 B2 | 10/2004 | Kobylevsky et al. | |
| 6,804,656 B1 | 10/2004 | Rosenfeld et al. | |
| 6,814,656 B2 | 11/2004 | Rodriguez | |
| 6,819,796 B2 | 11/2004 | Hong et al. | |
| 6,919,880 B2 | 7/2005 | Morrison et al. | |
| 6,950,534 B2 | 9/2005 | Cohen et al. | |
| 6,993,157 B1 | 1/2006 | Oue et al. | |
| 7,152,024 B2 | 12/2006 | Marschner et al. | |
| 7,213,707 B2 | 5/2007 | Hubbs et al. | |
| 7,215,828 B2 | 5/2007 | Luo | |
| 7,244,233 B2 | 7/2007 | Krantz et al. | |
| 7,257,237 B1 | 8/2007 | Luck et al. | |
| 7,259,873 B2 | 8/2007 | Sikora et al. | |
| 7,308,112 B2 | 12/2007 | Fujimura et al. | |
| 7,340,077 B2 | 3/2008 | Gokturk et al. | |
| 7,415,120 B1 * | 8/2008 | Vaudrey | H03G 3/32 381/109 |
| 7,519,223 B2 | 4/2009 | Dehlin et al. | |
| 7,532,206 B2 | 5/2009 | Morrison et al. | |
| 7,536,032 B2 | 5/2009 | Bell | |
| 7,542,586 B2 | 6/2009 | Johnson | |
| 7,598,942 B2 | 10/2009 | Underkoffler et al. | |
| 7,606,417 B2 | 10/2009 | Steinberg et al. | |
| 7,646,372 B2 | 1/2010 | Marks et al. | |
| 7,656,372 B2 | 2/2010 | Sato et al. | |
| 7,665,041 B2 | 2/2010 | Wilson et al. | |
| 7,692,625 B2 | 4/2010 | Morrison et al. | |
| 7,831,932 B2 | 11/2010 | Josephsoon et al. | |
| 7,840,031 B2 | 11/2010 | Albertson et al. | |
| 7,861,188 B2 | 12/2010 | Josephsoon et al. | |
| 7,940,885 B2 | 5/2011 | Stanton et al. | |
| 7,948,493 B2 | 5/2011 | Klefenz et al. | |
| 7,961,174 B1 | 6/2011 | Markovic et al. | |
| 7,961,934 B2 | 6/2011 | Thrun et al. | |
| 7,971,156 B2 | 6/2011 | Albertson et al. | |
| 7,980,885 B2 | 7/2011 | Gattwinkel et al. | |
| 8,064,704 B2 | 11/2011 | Kim et al. | |
| 8,085,339 B2 | 12/2011 | Marks | |
| 8,086,971 B2 | 12/2011 | Radivojevic et al. | |
| 8,111,239 B2 | 2/2012 | Pryor et al. | |
| 8,112,719 B2 | 2/2012 | Hsu et al. | |
| 8,144,233 B2 | 3/2012 | Fukuyama | |
| 8,185,176 B2 | 5/2012 | Mangat et al. | |
| 8,213,707 B2 | 7/2012 | Li et al. | |
| 8,218,858 B2 | 7/2012 | Gu | |
| 8,229,134 B2 | 7/2012 | Duraiswami et al. | |
| 8,244,233 B2 | 8/2012 | Chang et al. | |
| 8,249,345 B2 | 8/2012 | Wu et al. | |
| 8,289,162 B2 | 10/2012 | Mooring et al. | |
| 8,290,208 B2 | 10/2012 | Kurtz et al. | |
| 8,304,727 B2 | 11/2012 | Lee et al. | |
| 8,514,221 B2 | 8/2013 | King et al. | |
| 8,631,355 B2 | 1/2014 | Murillo et al. | |
| 8,638,989 B2 | 1/2014 | Holz | |
| 8,659,594 B2 | 2/2014 | Kim et al. | |
| 8,659,658 B2 | 2/2014 | Vassigh et al. | |
| 8,693,731 B2 | 4/2014 | Holz et al. | |
| 8,738,523 B1 | 5/2014 | Sanchez et al. | |
| 8,744,122 B2 | 6/2014 | Salgian et al. | |
| 8,817,087 B2 | 8/2014 | Weng et al. | |
| 8,842,084 B2 | 9/2014 | Andersson et al. | |
| 8,843,857 B2 | 9/2014 | Berkes et al. | |
| 8,872,914 B2 | 10/2014 | Gobush | |
| 8,929,609 B2 | 1/2015 | Padovani et al. | |
| 8,930,852 B2 | 1/2015 | Chen et al. | |
| 8,942,881 B2 | 1/2015 | Hobbs et al. | |
| 8,954,340 B2 | 2/2015 | Sanchez et al. | |
| 8,957,857 B2 | 2/2015 | Lee et al. | |
| 8,982,104 B1 | 3/2015 | Fujishima | |
| 9,056,396 B1 | 6/2015 | Linnell | |
| 9,070,019 B2 | 6/2015 | Holz | |
| 2002/0008211 A1 | 1/2002 | Kask | |
| 2002/0080094 A1 | 6/2002 | Biocca et al. | |
| 2002/0105484 A1 | 8/2002 | Navab et al. | |
| 2003/0009337 A1 * | 1/2003 | Rupsis | H04L 29/06027 704/260 |
| 2003/0053658 A1 | 3/2003 | Pavlidis | |
| 2003/0053659 A1 | 3/2003 | Pavlidis et al. | |
| 2003/0123703 A1 | 7/2003 | Pavlidis et al. | |
| 2003/0132950 A1 * | 7/2003 | Surucu | G06F 1/1626 715/700 |
| 2003/0152289 A1 | 8/2003 | Luo | |
| 2003/0202697 A1 | 10/2003 | Simard et al. | |
| 2004/0125228 A1 | 7/2004 | Dougherty | |
| 2004/0145809 A1 | 7/2004 | Brenner | |
| 2004/0212725 A1 | 10/2004 | Raskar | |
| 2005/0007673 A1 | 1/2005 | Chaoulov et al. | |
| 2005/0068518 A1 | 3/2005 | Baney et al. | |
| 2005/0131607 A1 | 6/2005 | Breed | |
| 2005/0156888 A1 | 7/2005 | Xie et al. | |
| 2005/0168578 A1 | 8/2005 | Gobush | |
| 2005/0236558 A1 | 10/2005 | Nabeshima et al. | |
| 2006/0017807 A1 | 1/2006 | Lee et al. | |
| 2006/0072105 A1 | 4/2006 | Wagner | |
| 2006/0204040 A1 | 9/2006 | Freeman et al. | |
| 2006/0210112 A1 | 9/2006 | Cohen et al. | |
| 2006/0290950 A1 | 12/2006 | Platt et al. | |
| 2007/0042346 A1 | 2/2007 | Weller | |
| 2007/0065140 A1 | 3/2007 | Sorsa | |
| 2007/0086621 A1 | 4/2007 | Aggarwal et al. | |
| 2007/0088544 A1 * | 4/2007 | Acero | G10L 21/02 704/226 |

(56) References Cited

U.S. PATENT DOCUMENTS

| | | |
|---|---|---|
| 2007/0130547 A1 | 6/2007 | Boillot |
| 2007/0188476 A1* | 8/2007 | Bayramoglu ......... G06F 3/0433 345/177 |
| 2007/0206719 A1 | 9/2007 | Suryanarayanan et al. |
| 2007/0238956 A1 | 10/2007 | Haras et al. |
| 2008/0013826 A1 | 1/2008 | Hillis et al. |
| 2008/0019576 A1 | 1/2008 | Senftner et al. |
| 2008/0031492 A1 | 2/2008 | Lanz |
| 2008/0056752 A1 | 3/2008 | Denton et al. |
| 2008/0064954 A1 | 3/2008 | Adams et al. |
| 2008/0106637 A1 | 5/2008 | Nakao et al. |
| 2008/0106746 A1 | 5/2008 | Shpunt et al. |
| 2008/0110994 A1 | 5/2008 | Knowles et al. |
| 2008/0118091 A1 | 5/2008 | Serfaty et al. |
| 2008/0187175 A1 | 8/2008 | Kim et al. |
| 2008/0244468 A1 | 10/2008 | Nishihara et al. |
| 2008/0273764 A1 | 11/2008 | Scholl |
| 2008/0278589 A1 | 11/2008 | Thorn |
| 2008/0304740 A1 | 12/2008 | Sun et al. |
| 2008/0319356 A1 | 12/2008 | Cain et al. |
| 2009/0002489 A1 | 1/2009 | Yang et al. |
| 2009/0093307 A1 | 4/2009 | Miyaki |
| 2009/0102840 A1 | 4/2009 | Li |
| 2009/0103780 A1 | 4/2009 | Nishihara et al. |
| 2009/0116742 A1 | 5/2009 | Nishihara |
| 2009/0122146 A1 | 5/2009 | Zalewski et al. |
| 2009/0203993 A1 | 8/2009 | Mangat et al. |
| 2009/0203994 A1 | 8/2009 | Mangat et al. |
| 2009/0217211 A1 | 8/2009 | Hildreth et al. |
| 2009/0245539 A1* | 10/2009 | Vaudrey ................ H03G 7/002 381/109 |
| 2009/0257623 A1 | 10/2009 | Tang et al. |
| 2009/0274339 A9 | 11/2009 | Cohen et al. |
| 2009/0309710 A1 | 12/2009 | Kakinami |
| 2010/0013832 A1 | 1/2010 | Xiao et al. |
| 2010/0020078 A1 | 1/2010 | Shpunt |
| 2010/0023015 A1 | 1/2010 | Park |
| 2010/0026963 A1 | 2/2010 | Faulstich |
| 2010/0027845 A1 | 2/2010 | Kim et al. |
| 2010/0046842 A1 | 2/2010 | Conwell |
| 2010/0053164 A1 | 3/2010 | Imai et al. |
| 2010/0058252 A1 | 3/2010 | Ko |
| 2010/0066737 A1 | 3/2010 | Liu |
| 2010/0066975 A1 | 3/2010 | Rehnstrom |
| 2010/0118123 A1 | 5/2010 | Freedman et al. |
| 2010/0125815 A1 | 5/2010 | Wang et al. |
| 2010/0141762 A1 | 6/2010 | Siann et al. |
| 2010/0158372 A1 | 6/2010 | Kim et al. |
| 2010/0177929 A1 | 7/2010 | Kurtz et al. |
| 2010/0201880 A1 | 8/2010 | Iwamura |
| 2010/0219934 A1 | 9/2010 | Matsumoto |
| 2010/0220552 A1 | 9/2010 | Owaki et al. |
| 2010/0222102 A1 | 9/2010 | Rodriguez |
| 2010/0264833 A1 | 10/2010 | Van Endert et al. |
| 2010/0277411 A1 | 11/2010 | Yee et al. |
| 2010/0296698 A1 | 11/2010 | Lien et al. |
| 2010/0302357 A1 | 12/2010 | Hsu et al. |
| 2010/0303298 A1 | 12/2010 | Marks et al. |
| 2010/0306712 A1 | 12/2010 | Snook et al. |
| 2010/0309097 A1 | 12/2010 | Raviv et al. |
| 2011/0007072 A1 | 1/2011 | Khan et al. |
| 2011/0026765 A1 | 2/2011 | Ivanich et al. |
| 2011/0043806 A1 | 2/2011 | Guetta et al. |
| 2011/0057875 A1 | 3/2011 | Shigeta et al. |
| 2011/0080470 A1 | 4/2011 | Kuno et al. |
| 2011/0080490 A1 | 4/2011 | Clarkson et al. |
| 2011/0093820 A1 | 4/2011 | Zhang et al. |
| 2011/0096033 A1 | 4/2011 | Ko |
| 2011/0107216 A1 | 5/2011 | Bi |
| 2011/0115486 A1 | 5/2011 | Frohlich et al. |
| 2011/0116684 A1 | 5/2011 | Coffman et al. |
| 2011/0119640 A1 | 5/2011 | Berkes et al. |
| 2011/0134112 A1 | 6/2011 | Koh et al. |
| 2011/0148875 A1 | 6/2011 | Kim et al. |
| 2011/0169726 A1 | 7/2011 | Holmdahl et al. |
| 2011/0173574 A1 | 7/2011 | Clavin et al. |
| 2011/0181509 A1 | 7/2011 | Rautiainen et al. |
| 2011/0193778 A1 | 8/2011 | Lee et al. |
| 2011/0205151 A1 | 8/2011 | Newton et al. |
| 2011/0213664 A1 | 9/2011 | Osterhout et al. |
| 2011/0228978 A1 | 9/2011 | Chen et al. |
| 2011/0234840 A1 | 9/2011 | Klefenz et al. |
| 2011/0261178 A1 | 10/2011 | Lo et al. |
| 2011/0267259 A1 | 11/2011 | Tidemand et al. |
| 2011/0279397 A1 | 11/2011 | Rimon et al. |
| 2011/0286676 A1 | 11/2011 | El Dokor |
| 2011/0289455 A1 | 11/2011 | Reville et al. |
| 2011/0289456 A1 | 11/2011 | Reville et al. |
| 2011/0291925 A1 | 12/2011 | Israel et al. |
| 2011/0291988 A1 | 12/2011 | Bamji et al. |
| 2011/0296353 A1 | 12/2011 | Ahmed et al. |
| 2011/0299737 A1 | 12/2011 | Wang et al. |
| 2011/0304650 A1 | 12/2011 | Campillo et al. |
| 2011/0310007 A1 | 12/2011 | Margolis et al. |
| 2011/0310220 A1 | 12/2011 | McEldowney |
| 2011/0314427 A1 | 12/2011 | Sundararajan |
| 2012/0038637 A1 | 2/2012 | Marks |
| 2012/0050157 A1 | 3/2012 | Latta et al. |
| 2012/0065499 A1 | 3/2012 | Chono |
| 2012/0068914 A1 | 3/2012 | Jacobsen et al. |
| 2012/0163675 A1 | 6/2012 | Joo et al. |
| 2012/0194517 A1 | 8/2012 | Izadi et al. |
| 2012/0204133 A1 | 8/2012 | Guendelman et al. |
| 2012/0223959 A1 | 9/2012 | Lengeling |
| 2012/0236288 A1 | 9/2012 | Stanley |
| 2012/0239174 A1 | 9/2012 | Shotton et al. |
| 2012/0250936 A1 | 10/2012 | Holmgren |
| 2012/0270654 A1 | 10/2012 | Padovani et al. |
| 2012/0274781 A1 | 11/2012 | Shet et al. |
| 2013/0019204 A1 | 1/2013 | Kotler et al. |
| 2013/0148852 A1 | 6/2013 | Partis et al. |
| 2013/0162600 A1 | 6/2013 | Chou et al. |
| 2013/0169546 A1* | 7/2013 | Thomas ................ G06F 9/4451 345/173 |
| 2013/0239059 A1 | 9/2013 | Chen et al. |
| 2013/0241832 A1 | 9/2013 | Rimon et al. |
| 2013/0257736 A1 | 10/2013 | Hou et al. |
| 2013/0300637 A1* | 11/2013 | Smits .................... G03B 35/18 345/8 |
| 2014/0049518 A1 | 2/2014 | Hunt et al. |
| 2014/0081521 A1 | 3/2014 | Frojdh et al. |
| 2014/0085203 A1 | 3/2014 | Kobayashi |
| 2014/0125813 A1 | 5/2014 | Holz |
| 2014/0139641 A1 | 5/2014 | Holz |
| 2014/0161311 A1 | 6/2014 | Kim |
| 2014/0168062 A1 | 6/2014 | Katz et al. |
| 2014/0177913 A1 | 6/2014 | Holz |
| 2014/0189579 A1 | 7/2014 | Rimon et al. |
| 2014/0222385 A1 | 8/2014 | Muenster et al. |
| 2014/0253512 A1 | 9/2014 | Narikawa et al. |
| 2014/0307920 A1 | 10/2014 | Holz |
| 2014/0364212 A1 | 12/2014 | Osman et al. |
| 2014/0375547 A1 | 12/2014 | Katz et al. |
| 2015/0003673 A1 | 1/2015 | Fletcher |
| 2015/0016777 A1 | 1/2015 | Abovitz et al. |
| 2015/0022447 A1 | 1/2015 | Hare et al. |
| 2015/0029091 A1 | 1/2015 | Nakashima et al. |
| 2015/0062091 A1* | 3/2015 | Li ........................... G01S 5/186 345/177 |
| 2015/0115802 A1 | 4/2015 | Kuti et al. |
| 2015/0116214 A1 | 4/2015 | Grunnet-Jepsen et al. |
| 2015/0131859 A1 | 5/2015 | Kim et al. |
| 2015/0138385 A1* | 5/2015 | Kim ................... H04N 5/23216 348/211.99 |

FOREIGN PATENT DOCUMENTS

| | | |
|---|---|---|
| CN | 201332447 Y | 10/2009 |
| CN | 101729808 A | 6/2010 |
| CN | 101930610 A | 12/2010 |
| CN | 101951474 A | 1/2011 |
| CN | 102053702 A | 5/2011 |
| CN | 201859393 U | 6/2011 |

(56) References Cited

FOREIGN PATENT DOCUMENTS

| | | |
|---|---|---|
| CN | 102201121 A | 9/2011 |
| CN | 102236412 A | 11/2011 |
| DE | 4201934 A1 | 7/1993 |
| DE | 102007015495 A1 | 10/2007 |
| DE | 102007015497 B4 | 1/2014 |
| EP | 0772169 A2 | 5/1997 |
| EP | 0999542 a1 | 5/2000 |
| EP | 1477924 A2 | 11/2004 |
| EP | 1837665 A2 | 9/2007 |
| EP | 2369443 A2 | 9/2011 |
| GB | 2419433 A | 4/2006 |
| GB | 2480140 A | 11/2011 |
| GB | 2519418 A | 4/2015 |
| JP | H08261721 A | 10/1996 |
| JP | H09259278 A | 10/1997 |
| JP | 2000023038 A | 1/2000 |
| JP | 2002-133400 A | 5/2002 |
| JP | 2003256814 A | 9/2003 |
| JP | 2004246252 A | 9/2004 |
| JP | 2006019526 A | 1/2006 |
| JP | 2006259829 A | 9/2006 |
| JP | 2007272596 A | 10/2007 |
| JP | 2008227569 A | 9/2008 |
| JP | 2009031939 A | 2/2009 |
| JP | M09037594 A | 2/2009 |
| JP | 2011010258 A | 1/2011 |
| JP | 2011065652 A | 3/2011 |
| JP | 1906960 B2 | 3/2012 |
| KR | 101092909 B1 | 6/2011 |
| RU | 2422878 C1 | 6/2011 |
| TW | 200844871 A | 11/2008 |
| WO | 1994026057 A1 | 11/1994 |
| WO | 2004114220 A1 | 12/2004 |
| WO | 2006020846 A2 | 2/2006 |
| WO | 2007137093 A2 | 11/2007 |
| WO | 201007662 A1 | 1/2010 |
| WO | 2010032268 A2 | 3/2010 |
| WO | 2010076622 A1 | 7/2010 |
| WO | 2010088035 A2 | 8/2010 |
| WO | 20100138741 A1 | 12/2010 |
| WO | 2011024193 A2 | 3/2011 |
| WO | 2011036618 A2 | 3/2011 |
| WO | 2011044680 A1 | 4/2011 |
| WO | 2011045789 A1 | 4/2011 |
| WO | 2011119154 A1 | 9/2011 |
| WO | 2012027422 A2 | 3/2012 |
| WO | 2013109608 A2 | 7/2013 |
| WO | 2013109609 A2 | 7/2013 |
| WO | 2014208087 A1 | 12/2014 |
| WO | 2015026707 A1 | 2/2015 |

OTHER PUBLICATIONS

U.S. Appl. No. 14/149,709—Notice of Allowance dated Jun. 6, 2016, 13 pages.
Multilateration. Wikipedia (the free encyclopedia) [online]. Nov. 16, 2012 [retrieved on Jan. 2, 2014]. Retrieved from the internet: <http://en.wikipedia.org/w/index.php?title=Multilateration &oldid=523281858>. 9 pages.
Jesse, V., Acoustic source localization. Wikipedia (the free encyclopedia) [online]. 03:28, Dec. 24, 2012 [retrieved on Jan. 2, 2014]. Retrieved from the internet: <http://en.wikipedia.org/w/index.php?title=Acoustic_source_localization&oldid=529531982>. 3 pages.
U.S. Appl. No. 14/149,676—Non Final Office Action dated Jan. 30, 2015, 11 pages.
Ehliar, A., et al, "Benchmarking Network Processors," Department of Electrical Engineering, Linkoping University, Sweden, Copyright 2004, 4 pages.
Texas Instruments, "QVGA 3D Time-of-Flight Sensor," Product Overview: OPT 8140, Dec. 2013, Texas Instruments Incorporated, 10 pages.
Texas Instruments, "4-Channel, 12-Bit, 80-MSPS ADC," VSP5324, Revised Nov. 2012, Texas Instruments ncorporated, 55 pages.
Texas Instruments, "Time-of-Flight Controller (TFC)," Product Overview; OPT9220, Jan. 2014, Texas Instruments Incorporated, 43 pages.
Dombeck, D., et al., "Optical Recording of Action Potentials with Second-Harmonic Generation Microscopy," The Journal of Neuroscience, Jan. 28, 2004, vol. 24(4): pp. 999-1003.
Davis et al., "Toward 3-D Gesture Recognition", International Journal of Pattern Recognition and Artificial Intelligence, vol. 13, No. 03, 1999, pp. 381-393.
Butail, S., et al., "Three-Dimensional Reconstruction of the Fast-Start Swimming Kinematics of Densely Schooling Fish," Journal of the Royal Society Interface, Jun. 3, 2011, retrieved from the Internet <http://www.ncbi.nlm.nih.gov/pubmed/21642367>, pp. 0, 1-12.
Kim, et al., "Development of an Orthogonal Double-Image Processing Algorithm to Measure Bubble," Department of Nuclear Engineering and Technology, Seoul National University Korea, vol. 39 No. 4, Published 6 Jul. 2007, pp. 313-326.
Barat et al., "Feature Correspondences From Multiple Views of Coplanar Ellipses", 2nd International Symposium on Visual Computing, Author Manuscript, 2006, 10 pages.
Cheikh et al., "Multipeople Tracking Across Multiple Cameras", International Journal on New Computer Architectures and Their Applications (IJNCAA), vol. 2, No. 1, 2012, pp. 23-33.
Rasmussen, Matihew K, "An Analytical Framework for the Preparation and Animation of a Virtual Mannequin forthe Purpose of Mannequin-Clothing Interaction Modeling", A Thesis Submitted in Partial Fulfillment of the Requirements for the Master of Science Degree in Civil and Environmental Engineering in the Graduate College of the Jniversity of Iowa, Dec. 2008, 98 pages.
Kuleskza et al., "Arrangement of a Multi Stereo Visual Sensor System for a Human Activities Space," Source: Stereo Vision, Book edited by: Dr. Asim Bhatti, ISBN 978-953-7619-22-0, Copyright Nov. 2008, I-Tech, Vienna, Austria, www.intechopen.com, pp. 153-173.
HeikkiLa, Janne, "Accurate Camera Calibration and Feature Based 3-D Reconstruction from Monocular Image Sequences", Infotech Oulu and Department of Electrical Engineering, University of Oulu, 1997, 129 pages.
PCT/US2013/021713, International Search Report and Written Opinion, Sep. 11, 2013, 7 pages. (WO 2013/109609).
Olsson, K., et al., "Shape from Silhouette Scanner—Creating a Digital 3D Model of a Real Object by Analyzing Photos From Multiple Views," University of Linkoping, Sweden, Copyright VCG 2001, Retrieved from the Internet: (http://liu.diva-portal.org/smash/get/diva2:18671/FULLTEXT01> on Jun. 17, 2013, 52 pages.
Forbes, K., et al., "Using Silhouette Consistency Constraints to Build 3D Models," University of Cape Town, Copyright De Beers 2003, Retrieved from the internet: <http://www.dip.ee.uctacza/~kforbes/Publications/Forbes2003Prasa.pdf> on Jun. 17, 2013, 6 pages.
May, S., et al., "Robust 3D-Mapping with Time-of-Flight Cameras," 2009 IEEE/RSJ International Conference on ntelligent Robots and Systems, Piscataway, NJ, USA, Oct. 10, 2009, pp. 1673-1678.
Kanhangad, V., et al., "A Unified Framework for Contactless Hand Verification," IEEE Transactions on Information Forensics and Security, IEEE, Piscataway, NJ, US., vol. 6, No. 3, Sep. 1, 2011, pp. 1014-1027.
Di Zenzo, S., et al., "Advances in Image Segmentation," Image and Vision Computing, Elsevier, Guildford, GBN, vol. 1, No. 1, Copyright Butterworth & Co Ltd., 1 Nov. 1983, pp. 196-210.
PCT/US2013/021709—International Search Report and Written Opinion dated Sep. 12 2013, 7 pages. (WO 2013/109608).
Arthington, et al., "Cross-section Reconstruction During Uniaxial Loading," Measurement Science and Technology, vol. 20, No. 7, Jun. 10, 2009, Retrieved from the Internet: http:iopscience.iop.org/0957-0233/20/7/075701, pp. 1-9.
Pedersini, et al., Accurate Surface Reconstruction from Apparent Contours, Sep. 5-8, 2000 European Signal Processing Conference EUSIPCO 2000, vol. 4, Retrieved from the Internet: http://home.deib.polimi.it/sarti/CV_and_publications.html, pp. 1-4.

(56) References Cited

OTHER PUBLICATIONS

Chung, et al., "International Journal of Computer Vision: RecoveringLSHGCs and SHGCs from Stereo" [on-line], Oct. 1996 [retrieved on Apr. 10, 2014], Kluwer Academic Publishers, vol. 20, issue 1-2, Retrieved from the Internet: http://link.springer.com/article/10.1007/BF00144116#, pp. 43-58.

Bardinet et al., "Fitting of iso-Surfaces Using Superquadrics and Free-Form Deformations" [on-line], Jun. 24-25, 1994 [retrieved Jan. 9, 2014], 1994 Proceedings of IEEE Workshop on Biomedical Image Analysis, Retrieved from the Internet: http://ieeeexplore.ieee.org/xpls/abs_all.jsp!arnumber=315882&tag=1, pp. 184-193.

U.S. Appl. No. 13/742,845—Non-Final Office Action dated Jul. 22, 2013, 19 pages.

U.S. Appl. No. 13/742,845—Notice of Allowance dated Dec. 5, 2013, 23 pages.

U.S. Appl. No. 13/742,953—Non-Final Office Action dated Jun. 14, 2013, 13 pages.

U.S. Appl. No. 13/742,953—Notice of Allowance dated Nov. 4, 2013, 14 pages.

PCT/US2013/021713—International Preliminary Report on Patentability, Jul. 22, 2014, 13 pages.

U.S. Appl. No. 13/414,485—Non Final Office Action dated May 19, 2014, 16 pages.

U.S. Appl. No. 13/414,485—Final Office Action dated Feb. 2, 2015, 30 pages.

U.S. Appl. No. 14/149,709—Non Final Office Action dated Jun. 29, 2015, 22 pages.

U.S. Appl. No. 14/149,676—Final Office Action dated Aug. 27, 2015, 15 pages.

PCT/US2013/069231—International Search Report and Written Opinion (Corrected Version), mailing date Mar. 13, 2014 (received date Mar. 20, 2014), 7 pages.

U.S. Appl. No. 13/744,810—Non Final Office Action dated Jun. 7, 2013, 15 pages.

U.S. Appl. No. 13/744,810—Final Office Action dated Dec. 16, 2013, 18 pages.

PCT/US2013/021713—International Search Report and Written Opinion, Sep. 11, 2013, 7 pages.

Cumani, A., et al., "Pattern Recognition: Recovering the 3D Structure of Tubular Objects From Stereo Silhouettes," Pattern Recognition, Elsevier, GB, vol. 30, No. 7, Jul. 1, 1997, Retrieved from the Internet: <http://www.sciencedirect.com/science/article/pii/S0031320396001446>, pp. 1051-1059.

PCT/US2013/021709—International Preliminary Report on Patentability dated Jul. 22, 2013, 22 pages.

PCT/US2013/069231—International Preliminary Report with Written Opinion dated May 12, 2015, 8 pages.

U.S. Appl. No. 14/106,148—Non Final Office Action dated Jul. 6, 2015, 14 pages.

U.S. Appl. No. 14/250,758—Non Final Office Action dated Jul. 6, 2015, 8 pages.

U.S. Appl. No. 13/414,485—Non Final Office Action dated Jul. 30, 2015, 22 pages.

U.S. Appl. No. 13/744,810—Notice of Allowance dated Nov. 6, 2015, 8 pages.

U.S. Appl. No. 13/744,810—Notice of Allowance dated Sep. 25, 2015, 11 pages.

U.S. Appl. No. 14/311,166—Non Final Office Action dated Oct. 8, 2015, 17 pages.

U.S. Appl. No. 14/149,676—Non Final Office Action dated Dec. 17, 2015, 19 pages.

\* cited by examiner

OBJECT DETECTION AND TRACKING FOR PROVIDING A VIRTUAL DEVICE EXPERIENCE

RELATED APPLICATION

The application claims the benefit of U.S. provisional Patent Application No. 61/927,919, entitled, "OBJECT DETECTION AND TRACKING FOR PROVIDING A VIRTUAL DEVICE EXPERIENCE," filed on Jan. 15, 2014. The provisional application is hereby incorporated by reference for all purposes.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Conventional motion capture approaches rely on markers or sensors worn by the subject while executing activities and/or on the strategic placement of numerous bulky and/or complex equipment in specialized environments to capture movements of the subjects. Unfortunately, such systems tend to be expensive to construct. In addition, markers or sensors worn by the subject can be cumbersome and interfere with the subject's natural movement. Further, systems involving large numbers of cameras tend not to operate in real time, due to the volume of data that needs to be analyzed and correlated. Such considerations have limited the deployment and use of motion capture technology.

Consequently, there is a need for improved techniques for capturing the motion of objects in real time without attaching sensors or markers thereto.

SUMMARY

Implementations of the technology disclosed address these and other problems by providing methods and systems for capturing motion and/or determining the path of an object traveling in relation to a surface based on acoustic or vibrational waves. Implementations can enable use of audio or vibrational contact detection suitable for gesture detection, providing a virtual device experience, and other machine control and/or machine communications applications.

The technology disclosed relates to operation of a motion-capture system. In particular, it relates to monitoring at least three vibration sensors coupled to a motion-capture system and tracking a position of the object responsive to detection of vibrations generated by contact of an object with a surface of a solid medium. The position of the object is tracked by detecting a first vibration through a first medium by a first sensor, detecting a second vibration through a second medium by at least a second and a third sensor, measuring a time difference of arrival (TDOA) of the second vibration at the at least second and third sensors with respect to a TDOA of the first vibration at the first sensor and mapping surface locations that satisfy the TDOA, calculating a distance from the object to the second and third sensor based on the respective TDOAs, and determining location information for the object relative to the sensors based on the mapped TDOA surface locations.

The technology disclosed also relates to creating a virtual device experience in a three-dimensional (3D) sensory environment. In particular, it relates to monitoring at least two contact microphones coupled to an optical motion-capture system, wherein the contact microphones are in contact with a surface that a user touches, projecting a virtual device onto at least a portion of a surface, and in response to detection of audio signals generated by contact of an object with the surface that the user touches, tracking a position of the object in with contact with the virtual device. The object's position is tracked by measuring a time difference of arrival (TDOA) of the audio signals at the contact microphones and mapping surface locations that satisfy the TDOA, analyzing at least one image, captured by a camera of the optical motion-capture system, of the object in contact with the virtual device, using the image analysis to select among the mapped TDOA surface locations as location on the surface portion of the virtual device, detecting location information of the user contact with the surface based at least in part upon audio signals produced by the contact, and communicating control information to a system based in part on a combination of the location on the surface portion of the virtual device and the detected location information of the user contact.

In one implementation, vibrational sensors and/or other types of sensors are coupled to a motion-capture system to monitor contact with a surface that a user can touch. A virtual device can be projected onto at least a portion of the surface. Location information of a user contact with the surface is determined based at least in part upon vibrations produced by the contact. Control information is communicated to a system based in part on a combination of the location on the surface portion of the virtual device and the detected location information of the user contact. The virtual device experience can be augmented in some implementations by the addition of haptic, audio and/or visual projectors.

In an implementation, when the sensors detect acoustical signals (or other vibrational phenomena) generated by contact of an object with the surface that the user touches, a position of the object traveling across and in contact with the surface is tracked.

In some implementations, an optical motion-capture system is also included. Object position is tracked by measuring a time difference of arrival (TDOA) of the audio signals at the contact vibrational sensors and mapping surface locations that satisfy the TDOA, analyzing at least one image, captured by a camera of the optical motion-capture system, of the object in contact with the surface, and using the image analysis to select among the mapped TDOA surface locations as a surface location of the contact.

In further implementations, a path of the object is calculated by repeatedly measuring TDOAs of the audio signals at the contact vibrational sensors responsive to successive contacts of the object with the surface and analyzing a sequence of images of the successive contacts of the object with the surface.

Advantageously, some implementations can enable touch gesture recognition. This capability allows the user to execute intuitive gestures involving contact with a surface. For example, in low-light situations where free-form gestures cannot be recognized optically with a sufficient degree of reliability, a device can provide a touch mode in which touch gestures are recognized. Some implementations can provide improved interfacing with a variety of machines (e.g., a computing systems, including desktop, laptop, tablet computing devices, special purpose computing machinery, including graphics processors, embedded microcontrollers, gaming consoles, audio mixers, or the like; wired or wirelessly coupled networks of one or more of the foregoing, and/or combinations thereof), obviating or reducing the need for contact-based input devices such as a mouse, joystick, touch pad, or touch screen. Some implementations can provide for improved interface with computing and/or other machinery than would be possible with heretofore known techniques. In some implementations, a richer human—machine interface experience can be provided.

Other aspects and advantages of the present invention can be seen on review of the drawings, the detailed description and the claims, which follow.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Among other aspects, implementations described herein with reference to example implementations can provide for automatically (e.g., programmatically) capturing motion and/or determining the path of an object traveling in relation to a surface based on acoustic or vibrational waves. Implementations can enable use of audio or vibrational contact detection suitable for gesture detection and other machine control and/or communications applications. Some implementations include vibrational detection with optical image sensing. For example, a sequence of images can be correlated to construct a 3-D model of the object, including its position and shape. A succession of images can be analyzed using the same technique to model motion of the object such as free-form gestures. In low-light or other situations not conducive to optical imaging, where free-form gestures cannot be recognized optically with a sufficient degree of reliability, audio signals can supply the direction and location of the object as further described herein. In some implementations, projection techniques can supplement the vibrational wave tracking to provide virtual device experience, a functional equivalent to an experience with a device.

Figure 1:
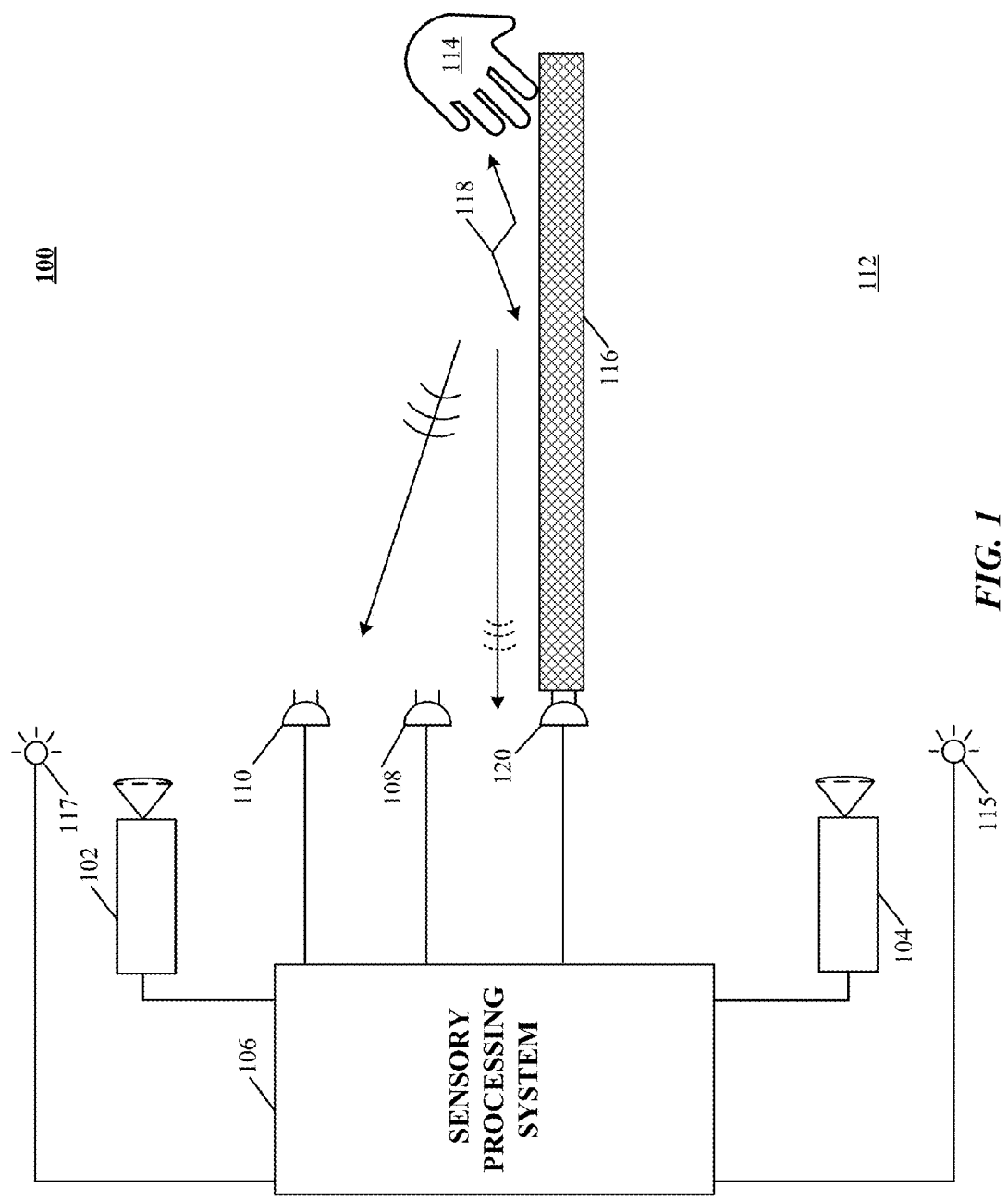
FIG. 1 illustrates a system for capturing image and audio data according to an implementation of the technology disclosed.

Refer first to FIG. 1, which illustrates a system 100 for capturing vibrational waves and image data according to one implementation of the technology disclosed. System 100 includes a plurality of vibrational sensors 108, 110 and 120 coupled to the sensory processing system 106. Vibrational sensors 108, 110 and 120 can be any type of sensor useful for obtaining signals from vibrational waves travelling through a medium, e.g., microphones including electromagnetic induction (dynamic microphones), capacitance change (condenser microphones), piezoelectric response, or light modulation to produce an electrical signal from mechanical vibration; more generally, the term "microphone" herein refers to any device (or combination of devices) capable of converting mechanical vibration into an electrical signal.

Vibrational sensors 108, 110 and 120 in the illustrated implementation are capable of capturing audio signals (or other vibrational waves) as they propagate through one or more media; for example, one or more vibrational sensors 120 may be disposed to capture vibrational waves propagating through a medium 116. Such devices can include pickups or piezos, and are designed to sense audio vibrations through solid objects. One or more vibrational sensors 108, 110 may be disposed to capture vibrational waves travelling through a second medium 112 (e.g., air). While the figures depict one contact microphone and two air microphones, this disclosure also covers more contact microphones than air microphones not depicted for clarity sake. Many types of vibrational sensors exist and implementation alternatives vary widely. Commonly available microphone elements include a thin piezoelectric ceramic round glued to a thin brass or alloy metal disc. More recently, flexible PVDF fluoropolymer piezo films have been used.

The illustrated system 100 can include any number of cameras 102, 104 coupled to sensory processing system 106. Cameras 102, 104 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

When present, cameras 102, 104 are oriented toward a region of interest that includes second medium 112, at least a portion of a surface of medium 116, in which an object of interest 114 (in this example, a hand) moves across and in contact with the surface of medium 116 along the indicated path 118. The sensors 108, 110 are positioned for contact with a surface of medium 116 for capturing audio signals propagating there through. In some implementations, light sources 115, 117 are arranged to illuminate the region of interest that includes second medium 112. In some implementations, one or more of the cameras 102, 104 are disposed opposite the motion to be detected, e.g., where the hand 114 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Sensory processing system 106, which can be, e.g., a computer system, can control the operation of sensors 108, 110 and cameras 102, 104 to capture images of the region of interest 112 and audio signals propagating through surface of medium 116. While referred to herein as a surface of medium 116, medium 116 can comprise a single surface, or multiple surfaces through which vibrations can propagate from one to the next. Based on the captured images and audio signals, sensory processing system 106 determines the position and/or motion of object 114.

For example, as an action in determining the motion of object 114, sensory processing system 106 can determine which pixels of various images captured by cameras 102, 104 contain portions of object 114. In some implementations, any pixel in an image can be classified as an "object" pixel or a "background" pixel depending on whether that pixel contains a portion of object 114 or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using cameras to capture images of the object and analyzing the images to detect object edges. Correlating object positions between images from cameras 102, 104 allows sensory processing system 106 to determine the location in 3D space of object 114, and analyzing sequences of images allows sensory processing system 106 to reconstruct 3D motion of object 114 using conventional motion algorithms or other techniques. See, e.g., U.S. patent application Ser. No. 13/414,485 (filed on Mar. 7, 2012) and U.S. Provisional Patent Application Nos. 61/724,091 (filed on Nov. 8, 2012) and 61/587,554 (filed on Jan. 7, 2012), the entire disclosures of which are hereby incorporated by reference.

For example, in low-light situations where free-form gestures cannot be recognized optically with a sufficient degree of reliability, system 106 may switch to a touch mode in which touch gestures are recognized. Alternatively, system 106 may switch to the touch mode, or supplement image capture and processing with touch sensing, when signals from sensors 108, 110 and 120 are sensed. In still another operational mode, a tap or touch gesture may act as a "wake up" signal to bring the image and audio analysis system 106 from a standby mode to an operational mode. For example, the system 106 may enter the standby mode if optical signals from the cameras 102, 104 are absent for longer than a threshold interval. Because the sensors 108, 110 and 120 can generate detectable electrical signals without external power, the system 106 may contain an ultra-low-power wake-up circuit such as those designed for low-voltage detection (for example, the Microchip AN879 module).

In determining the motion of object 114, sensory processing system 106 can determine its location and direction by computationally analyzing the audio signals captured by sensors 108, 110. For example, any part of object 114 that comes in contact with a surface of medium 116 can be classified as a "source" of the audio signals captured. The mechanical vibrations that can be interpreted as sound are able to travel through all forms of matter: gases, liquids, solids, and plasmas. The matter that supports the sound is called the medium. For example, a surface of medium 116 may be a solid material—e.g., one with enough surface texture to generate contact noise when rubbed. One conventional approach to obtaining the source direction of an audio signal in such an environment is the time difference of arrival (TDOA) method. Wikipedia, at http://en.wikipedia.org/w/index.php?title=Acoustic source localization&oldid=529531982, Acoustic source localization, on Dec. 24, 2012, 03:28 UTC.

"With a sensor array consisting of at least two sensors it is possible to obtain the source direction using the cross-correlation function between each sensor's signals. For example, the cross-correlation function between two sensors is defined as:

$$R_{x1,x2}(\tau) = \sum_{n=-\infty}^{\infty} x_1(n) x_2(n+\tau)$$

which defines the level of correlation between the outputs of two sensors $x_1$ and $x_2$. In general, a higher level of correlation means that the argument $\tau$ is relatively close to the actual TDOA. For two sensors next to each other, the TDOA is given by:

$$\tau_{true} = \frac{d_{spacing}}{c}$$

where c is the speed of sound in the medium 116." Ibid. It can be assumed that the medium 116 is one commonly used for desk or table tops, such as wood, for which a value of c is known. Sensory processing system 106 can be configured in various ways to ascertain the medium 116 and/or the speed of sound propagation in that medium. Id.

In one implementation, sensory processing system 106 stores a table of audio signatures—i.e., response characteristics—produced by a specific gesture (e.g., a finger swipe) performed on various surfaces. The user is instructed to perform this gesture when the system is first used on a particular surface, and the response characteristics are detected by sensory processing system 106 (via sensors 108, 110) and compared to find the best-matching signature. Each signature is associated with a particular medium and, more importantly, the speed of sound therein. Accordingly, when the best-matching signature is located, the associated value of is c used.

"Multilateration is a navigation technique based on the measurement of the difference in distance to two or more stations at known locations that broadcast signals at known times. See Wikipedia, at http://en.wikipedia.org/w/index.php?title=Multilateration&oldid=523281858, on Nov. 16, 2012, 06:07 UTC, Multilateration (incorporated by reference link in Wikipedia, Acoustic source localization). Unlike measurements of absolute distance or angle, measuring the difference in distance results in an infinite number of locations that satisfy the measurement. When these possible locations are plotted, they form a hyperbolic curve. To locate the exact location along that curve, a second measurement is taken to a different pair of stations to produce a second curve, which intersects with the first. When the two are compared, a small number of possible locations are revealed, producing a "fix." In simple terms, with two receivers at known locations, an emitter can be located onto a hyperboloid. Note that the receivers do not need to know the absolute time at which the pulse was transmitted—only the time difference is needed. Ibid.

In some implementations, audio signals outside a defined range will be excluded from analysis by a filter to remove background noise. Once again, the properties of the medium as identified by signal matching can be used to define the characteristics of a suitable filter, which may be implemented in software or controllable hardware by sensory processing system 106.

Figure 2:
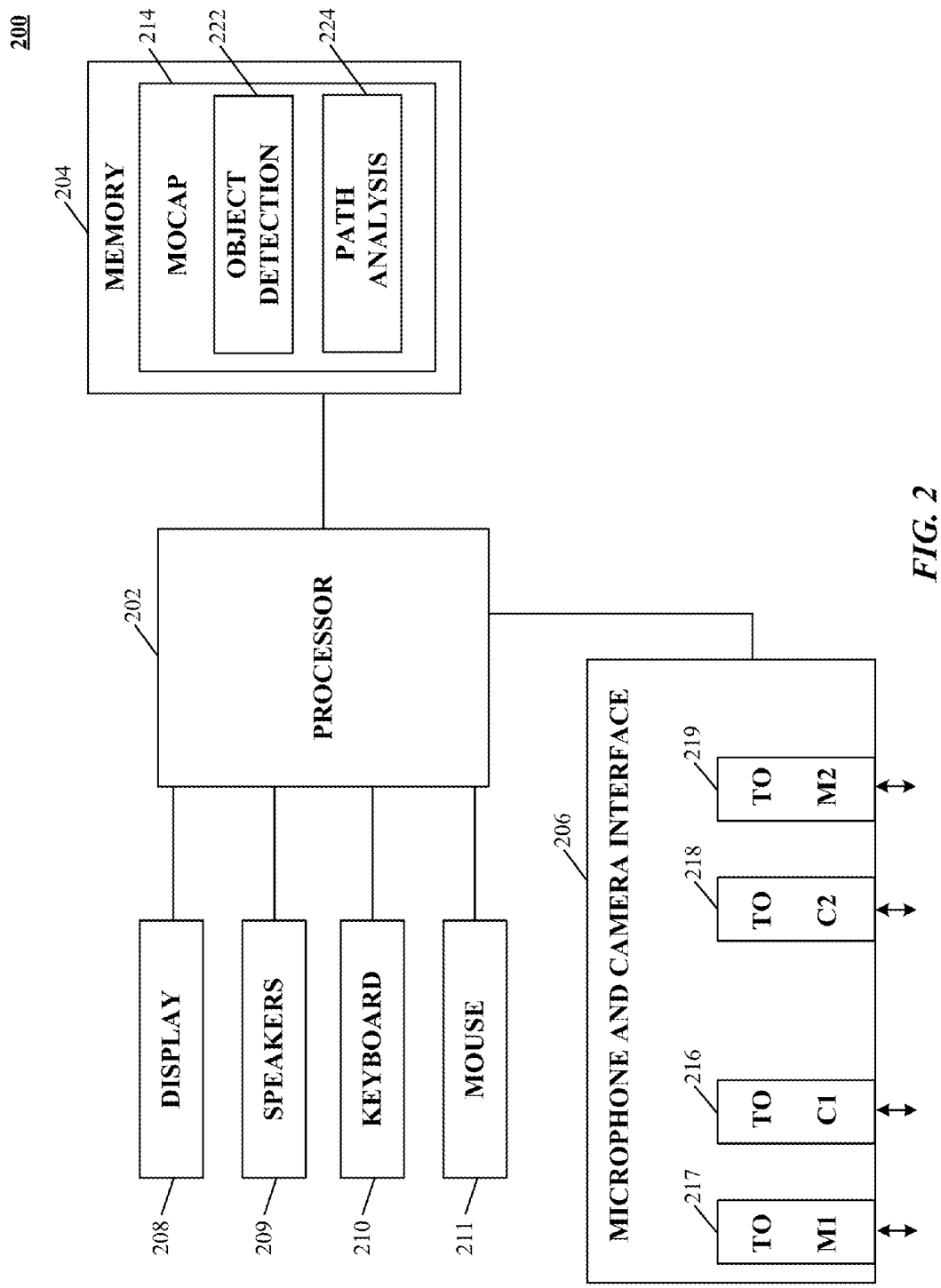
FIG. 2 is a simplified block diagram of a computer system implementing an image analysis apparatus according to an implementation of the technology disclosed.

Refer now to FIG. 2, which shows a simplified block diagram of a computer system 200 for implementing sensory processing system 106. Computer system 200 includes a processor 202, a memory 204, a microphone and camera interface 206, a display 208, speakers 209, a keyboard 210, and a mouse 211. Memory 204 can be used to store instructions to be executed by processor 202 as well as input and/or output data associated with execution of the instructions. In particular, memory 204 contains instructions, conceptually illustrated as a group of modules described in greater detail below, that control the operation of processor 202 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENACTION operating system, iOS, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 202 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Microphone and camera interface 206 can include hardware and/or software that enables communication between computer system 200 and cameras 102, 104, as well as microphones 108, 110 (see FIG. 1). Thus, for example, microphone and camera interface 206 can include one or more camera data ports 216, 218 and microphone ports 217, 219 to which the cameras and microphones can be connected (via conventional plugs and jacks), as well as hardware and/or software signal processors to modify data signals received from the cameras and microphones (e.g., to reduce noise or reformat data) prior to providing the signals as inputs to a motion-capture ("mocap") program 214 executing on processor 202. In some implementations, microphone and camera interface 206 can also transmit signals to the cameras and microphones, e.g., to activate or deactivate them, to control camera settings (frame rate, image quality, sensitivity, etc.), to control microphone settings (calibration, sensitivity levels, etc.), or the like. Such signals can be transmitted, e.g., in response to control signals from processor 202, which may in turn be generated in response to user input or other detected events.

Instructions defining mocap program 214 are stored in memory 204, and these instructions, when executed, perform motion-capture analysis on images supplied from cameras and audio signals from microphones connected to microphone and camera interface 206. In one implementation, mocap program 214 includes various modules, such as an object analysis module 222 and a path analysis module 224. Object analysis module 222 can analyze images (e.g., images captured via interface 206) to detect edges of an object therein and/or other information about the object's location. Object analysis module 222 can also analyze audio signals (e.g., audio signals captured via interface 206) to localize the object by, for example, triangulation as discussed above. Path analysis module 224 can track and predict object movements in 3D based on information obtained via the cameras. Audio signals place the object on a known surface, and the strength and variation of the signals can be used to detect object's presence. Successive camera images are analyzed at the pixel level to extract object movements and velocities. If both audio and image information is simultaneously available, both types of information can be analyzed and reconciled to produce a more detailed and/or accurate path analysis.

Display 208, speakers 209, keyboard 210, and mouse 211 can be used to facilitate user interaction with computer system 200. These components can be of generally conventional design or modified as desired to provide any type of user interaction. In some implementations, results of motion capture using microphone and camera interface 206 and mocap program 214 can be interpreted as user input. For example, a user can perform hand gestures or motions across a surface that are analyzed using mocap program 214, and the results of this analysis can be interpreted as an instruction to some other program executing on processor 200 (e.g., a web browser, word processor, or other application). Thus, by way of illustration, a user might use upward or downward swiping gestures to "scroll" a webpage currently displayed on display 208, to use rotating gestures to increase or decrease the volume of audio output from speakers 209, and so on. Path analysis module 224 may represent the detected path as a vector and extrapolate to predict the path, e.g., to improve rendering of action on display 208 by anticipating movement.

It will be appreciated that computer system 200 is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some implementations, one or more cameras and two or more microphones may be built into the computer rather than being supplied as separate components. Further, an image or audio analyzer can be implemented using only a subset of computer system components (e.g., as a processor executing program code, an ASIC, or a fixed-function digital signal processor, with suitable I/O interfaces to receive image data and output analysis results).

While computer system 200 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired. Thus, for example, execution of object analysis module 222 by processor 202 can cause processor 202 to operate microphone and camera interface 206 to capture images and/or audio signals of an object traveling across and in contact with a surface to detect its entrance by analyzing the image and/or audio data.

Figure 3A:
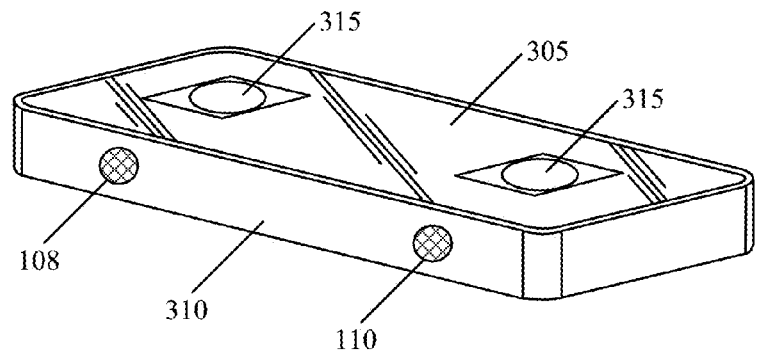
FIG. 3A is a perspective view from the top of a sensor in accordance with the technology disclosed, with vibrational sensors along an edge surface thereof.
Figure 3B:
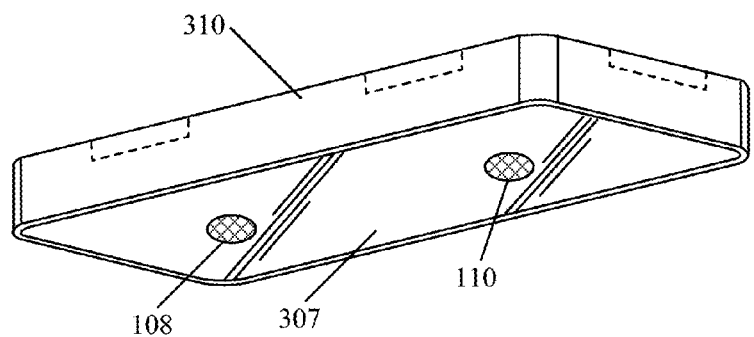
FIG. 3B is a perspective view from the bottom of a sensor in accordance with the technology disclosed, with vibrational sensors along the bottom surface thereof.
Figure 3C:
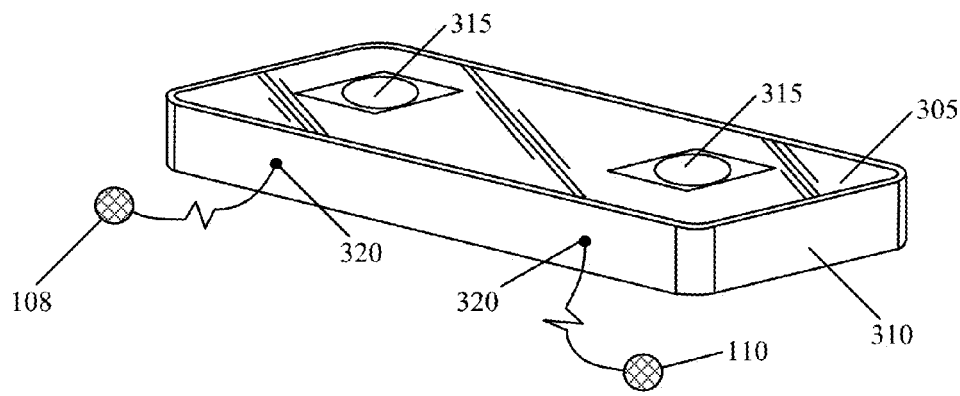
FIG. 3C is a perspective view from the top of a sensor in accordance with the technology disclosed, with detachable vibrational sensors configured for placement on a surface.

FIGS. 3A-3C illustrate three different configurations of system 100, all packaged within a single housing as an integrated sensor. In all cases, sensor 300A, 300B, 300C includes a top surface 305, a bottom surface 307, and a side wall 310 spanning the top and bottom surfaces 305, 307.

With reference also to FIG. 1, the top surface 305 of sensor 300A contains a pair of windows 315 for admitting light to the cameras 102, 104, one of which is optically aligned with each of the windows 315. If the system includes light sources 115, 117, surface 305 may contain additional windows for passing light to the object(s) being tracked.

In sensor 300A, microphones 108, 110 are located on the side wall 310. Desirably, the microphones are flush with the surface of side wall 310 so that, with this surface in contact with a table or other bearing surface, the microphones are in contact with the bearing surface. Of course, the microphones can be recessed slightly from side wall 310 in order to prevent frictional damage so long as acoustic coupling to the bearing surface remains adequate. This configuration allows the sensor 300A to be positioned to face objects in contact with and traveling across the bearing surface, so that tracking can be based simultaneously on optical and audio signals.

In sensor 300B, microphones 108, 110 are located on the bottom surface 307, once again in a flush or slightly recessed configuration. The top surface of the sensor 300B (not shown in the figure) contains camera windows 315 as shown in FIG. 3A. This arrangement is well-suited to applications in which the sensor is primarily used for optical tracking above the bearing surface, and audio tracking based on movements along and in contact with the bearing surface represent an alternative operational mode—e.g., the user may tap the bearing surface in order to "wake up" sensor 300B from a standby mode.

In FIG. 3C, microphones 108, 110 are external contact transducers that connect to sensor 300A via audio jacks 320. This configuration permits the microphones to be located away from the sensor, e.g., if the sensor does not rest on the surface with which tracked objects make contact.

It will be appreciated that the figures shown in FIGS. 3A-3C are illustrative. In some implementations, it may be desirable to house the system 100 in a differently shaped enclosure or integrated within a larger component or assembly. Furthermore, the microphones are depicted as small cylindrical discs, but neither the size nor the shape is critical.

Figure 4:
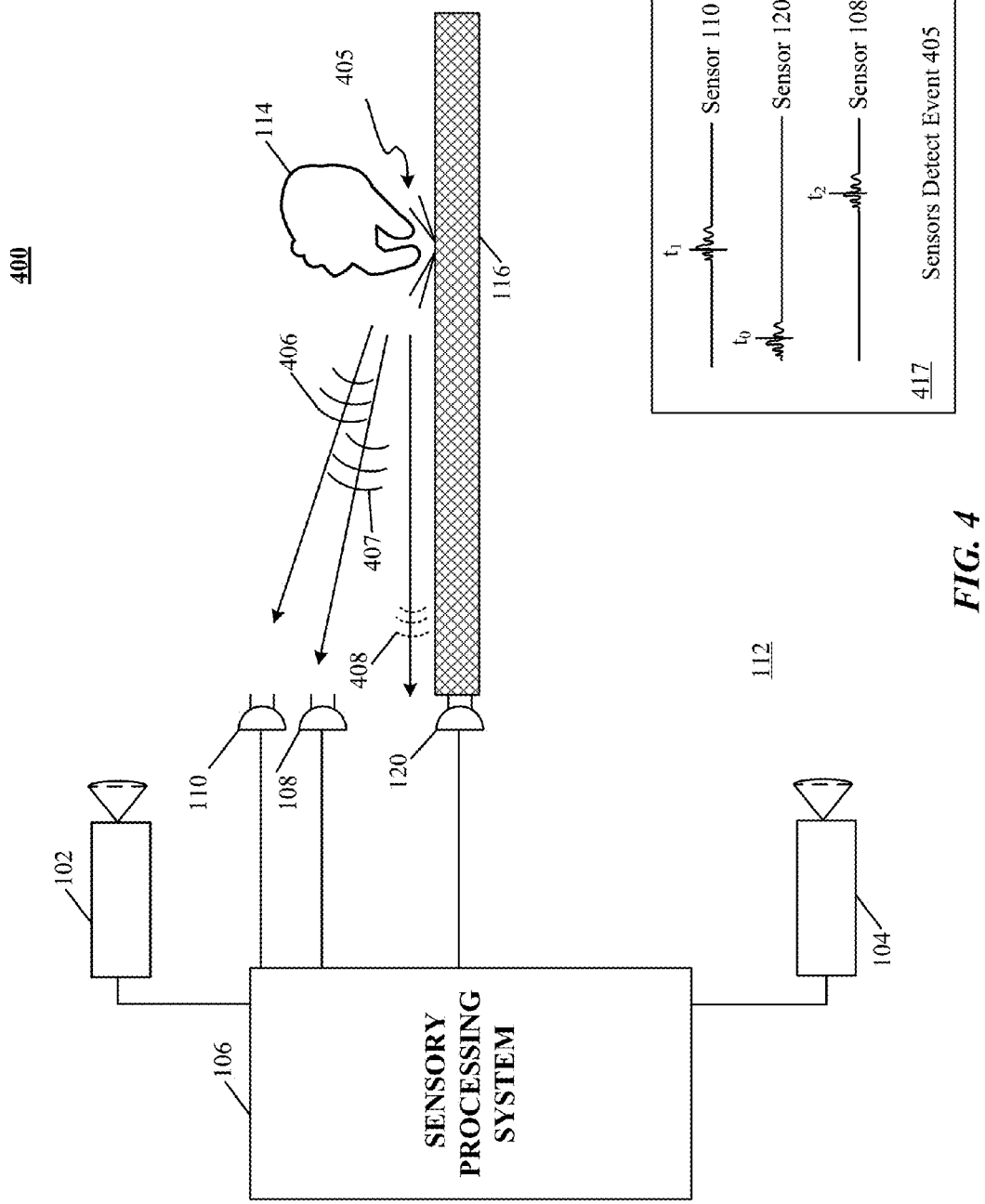
FIG. 4 illustrates one implementation of a system for measuring a time difference of arrival (TDOA) of the audio signals at vibration sensors and determining location information based upon the TDOA.

FIG. 4 illustrates one implementation of a system for measuring a time difference of arrival (TDOA) of the audio signals at vibration sensors and determining location information based upon the TDOA. In particular, when an object 114 comes in contact with a medium 116 during an event 405 (e.g., a contact with medium 116), the resulting mechanical vibrations generate waves 406, 407 and 408. These waves 406, 407 and 408 are detected by vibration sensors 108, 110 and 120 respectively at different times due to the different distances of the sensors 108 and 110 from the object 114 and the difference in the velocity that the wave 408 travels through medium 116 as compared with the velocity that waves 406 and 407 travel through a second medium 112. Inset 417 illustrates time difference information indicating detection of event 405 by the vibration sensors 108, 110 and 120. In one implementation, the time difference information for a given set of vibration sensors can be used to determine distance and/or other location information of object 114. In some implementations optical information from camera 102 and/or camera 104 can be used to determine additional location information to obtain a unique position of object 114.

Figure 5:
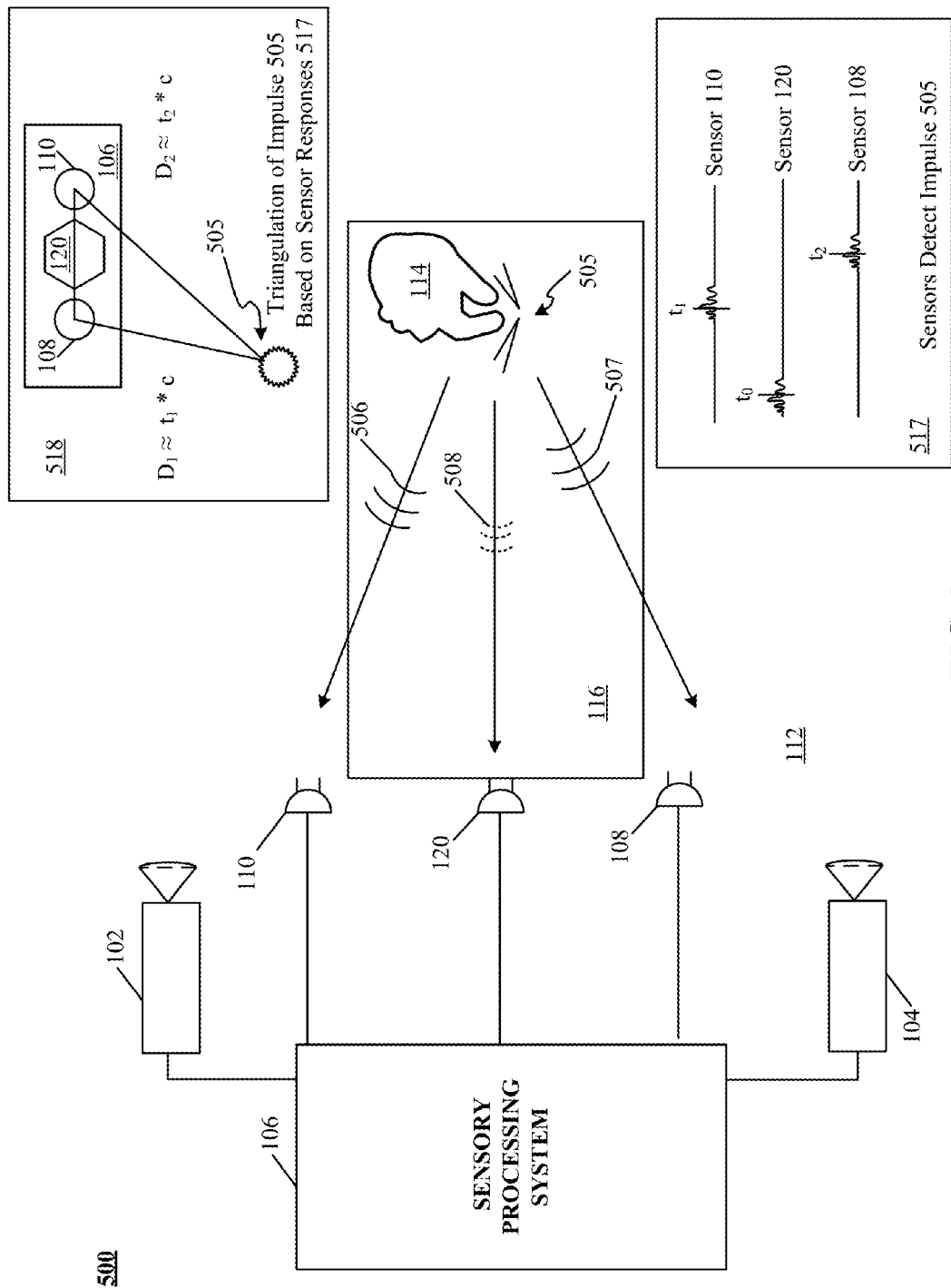
FIG. 5 illustrates one implementation of a system for measuring a time difference of arrival (TDOA) of the audio signals at vibration sensors and determining location information based upon the TDOA.

FIG. 5 illustrates one implementation of a system 500 for measuring a time difference of arrival (TDOA) of the audio signals at vibration sensors and determining location information based upon the TDOA. FIG. 5 shows an event 505 in which object 114 contacts a first medium 116, setting up waves 508 travelling through medium 116 and waves 506 and 507 travelling through a second medium 112. Inset 518 illustrates use of time difference of arrival information, in one implementation, to determine distance information for the event 505. Arrival of the first vibrational wave 508 at the first sensor 120 is used as a time reference from which to measure a delay ($t_1$-$t_0$) from which arrival of the wave 506 at the second sensor 108 and delay ($t_2$-$t_0$) from which the arrival of the wave 507 at the third sensor 110 are measured. The delays, $t_2$ and $t_1$, the velocity c that the subsequent vibrational waves travel through the second medium, are used to compute distance information from the contact 505 to the sensor(s) 108 and 110 as shown by inset 518.

Figure 6:
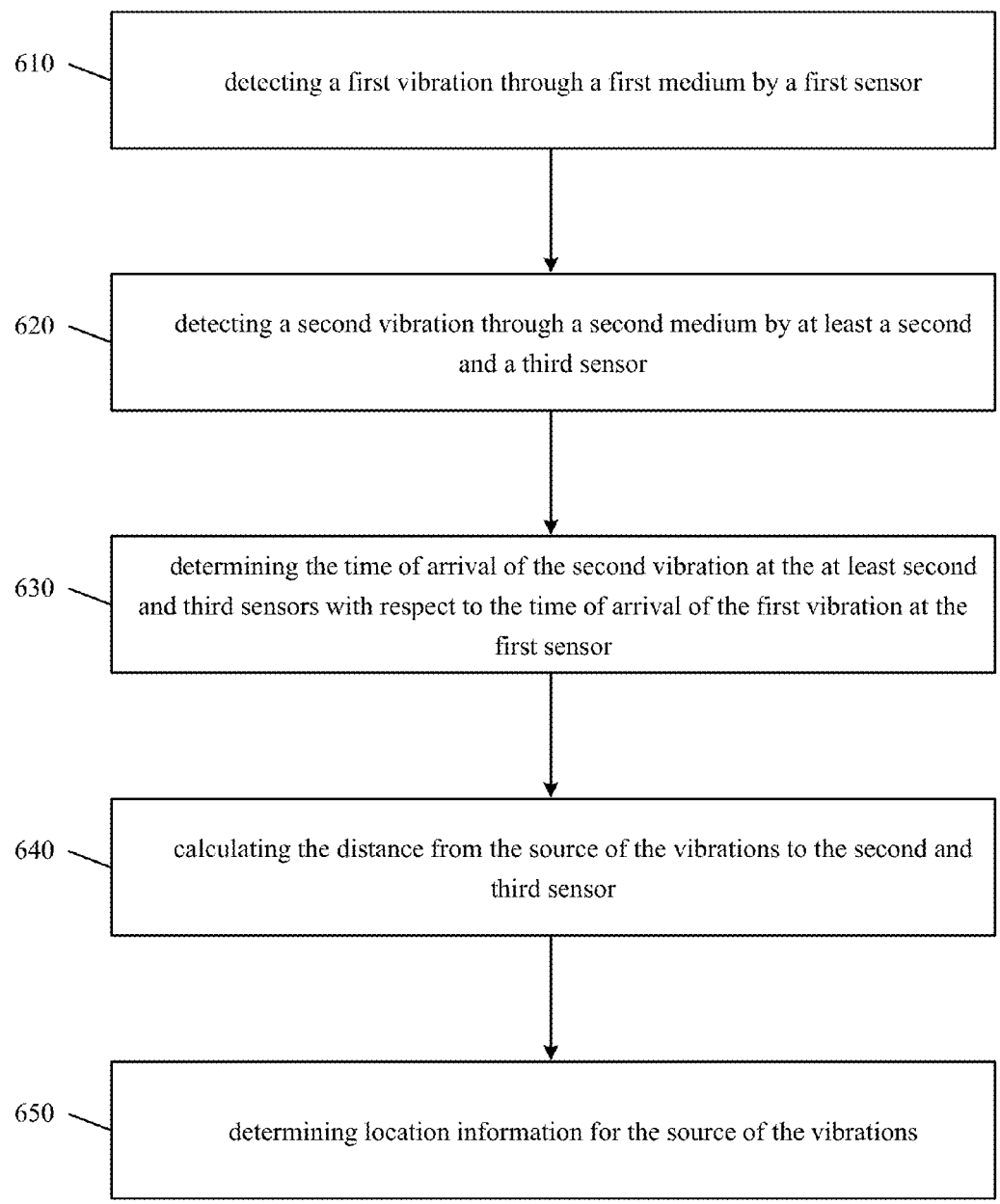
FIG. 6 shows a flowchart of one implementation of determining location information based at least in part upon audio signals.

FIG. 6 shows a flowchart 600 of one implementation of determining location information based at least in part upon audio signals. Flowchart 600 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this flowchart is described with reference to the system that carries out a method. The system is not necessarily part of the method.

At action 610, least one vibrational sensor, coupled to a motion-capture system and in contact with a first medium that a user (or control object manipulated by a user) comes in contact, is monitored to detect a first vibration through a first medium by a first sensor. In one implementation, the contact is a touch, tap, sequence of taps, or swiping motions of an object traveling across and in contact with a surface. In another implementation, the vibrational sensor is omni-directional. In yet another implementation, the vibrational sensor comprises a surface microphone.

At action 620, a second vibration travelling through a second medium is detected by at least a second and a third sensor. The second vibration also results from the contact that produced the first vibration.

At action 630, a time of arrival of the second vibration at the at least second and third sensors is determined with respect to the time of arrival of the first vibration at the first sensor.

At action 640, a distance from the source of the vibrations to the second and third sensor is calculated. In one implementation, arrival of the first vibrational wave at the first sensor is used to measure a delay from which arrival of the subsequent waves as the second and third sensors is measured. The delay, and the velocity that the subsequent vibrational waves travel through the second medium, is used to compute distance information from the contact 605 to the sensor(s).

At action 650, location information for the source of the vibrations is determined. In one implementation, a triangulation technique is used.

Figure 7:
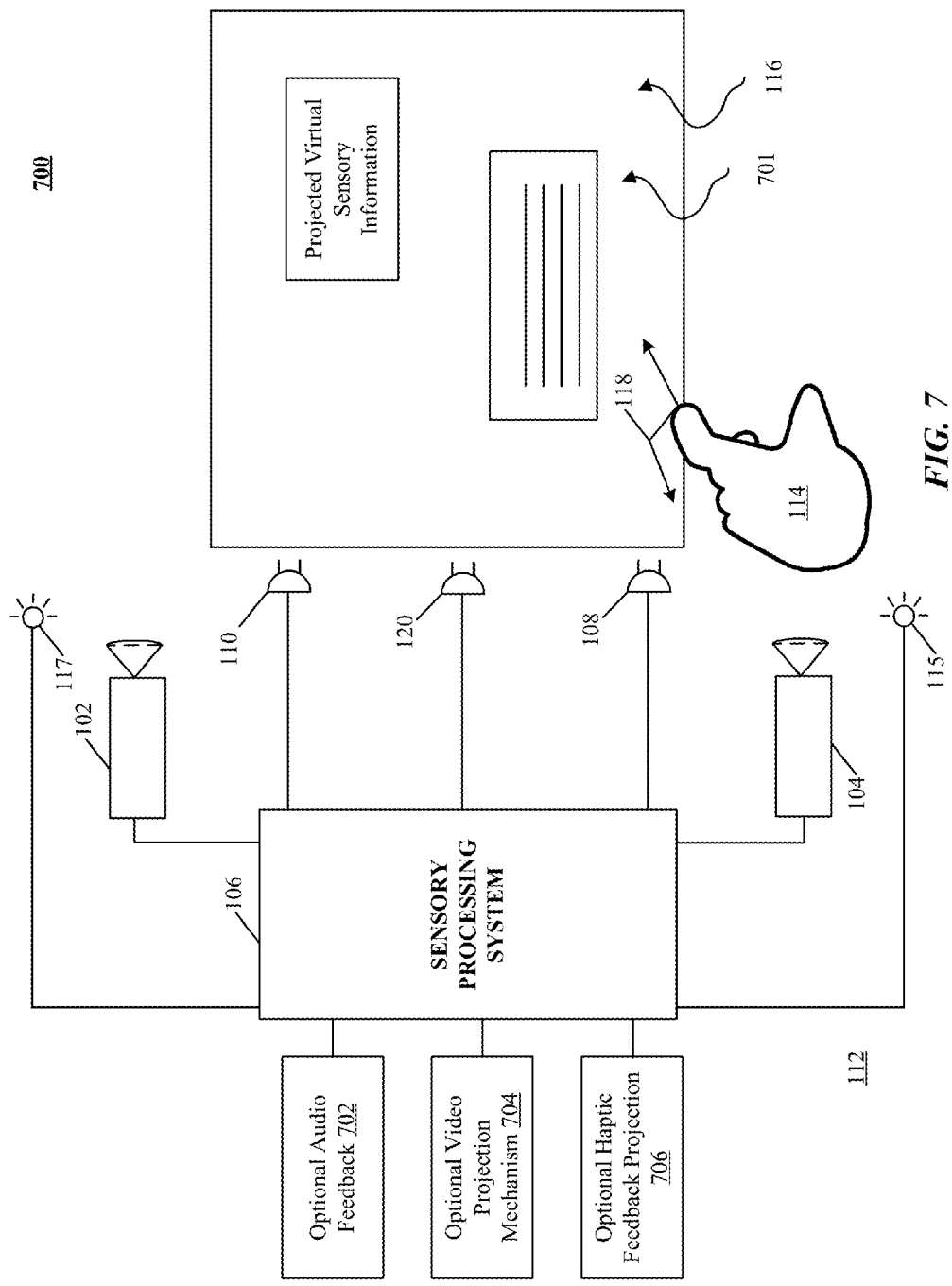
FIG. 7 illustrates one implementation of a system for providing a virtual device experience.

Now with reference to FIG. 7, which illustrates a system 700 for projecting a virtual device experience 701 onto a surface of medium 116 according to one implementation of the technology disclosed. System 700 includes a processing system 106 controlling a variety of sensors and projectors, such as a plurality of vibrational sensors 108, 110 and 120 positioned for sensing contacts along a contact path 118 with a surface of medium 116. Optionally, system 106 can control an imaging system comprising for example one or more cameras 102, 104 (or other image sensors) and optionally some illumination sources 115, 117. Optionally projectors under control of system 106 can augment the virtual device experience 701, such as an optional audio projector 702 to provide for example audio feedback, optional video projector 704, an optional haptic projector 706 to provide for example haptic feedback to a user of virtual device experience 701. For further information on projectors, reference may be had to "Visio-Tactile Projector" YouTube (https://www.youtube.com/watch?v=Bb0hNMxxewg) (accessed Jan. 15, 2014). In operation, sensors and projectors are oriented toward a region of interest that includes second medium 112, at least a portion of a surface of medium 116, in which an object of interest 114 (in this example, a hand) moves across and in contact with the surface of medium 116 along the indicated path 118.

In other implementations, a virtual device experience can be created in an augmented reality (AR) environment created by instantiation of a free-floating virtual modality in a real world physical space. In one implementation, computer-generated imagery, presented as free-floating virtual modality, can be rendered in front of a user as reflections using real-time rendering techniques such as orthographic or perspective projection, clipping, screen mapping, rasterizing and transformed into the field of view or current view space of a live camera embedded in a video projector, holographic projection system, smartphone, wearable goggle or other head mounted display (HMD), or heads up display (HUD). In some other implementations, transforming models into the current view space can be accomplished using sensor output from onboard sensors. For example, gyroscopes, magnetometers and other motion sensors can provide angular displacements, angular rates and magnetic readings with respect to a reference coordinate frame, and that data can be used by a real-time onboard rendering engine to generate 3D imagery of virtual device. If the user physically moves a user computing device or resulting in a change of view of the embedded camera, the virtual modality and computer-generated imagery can be updated accordingly using the sensor data.

Figure 8:
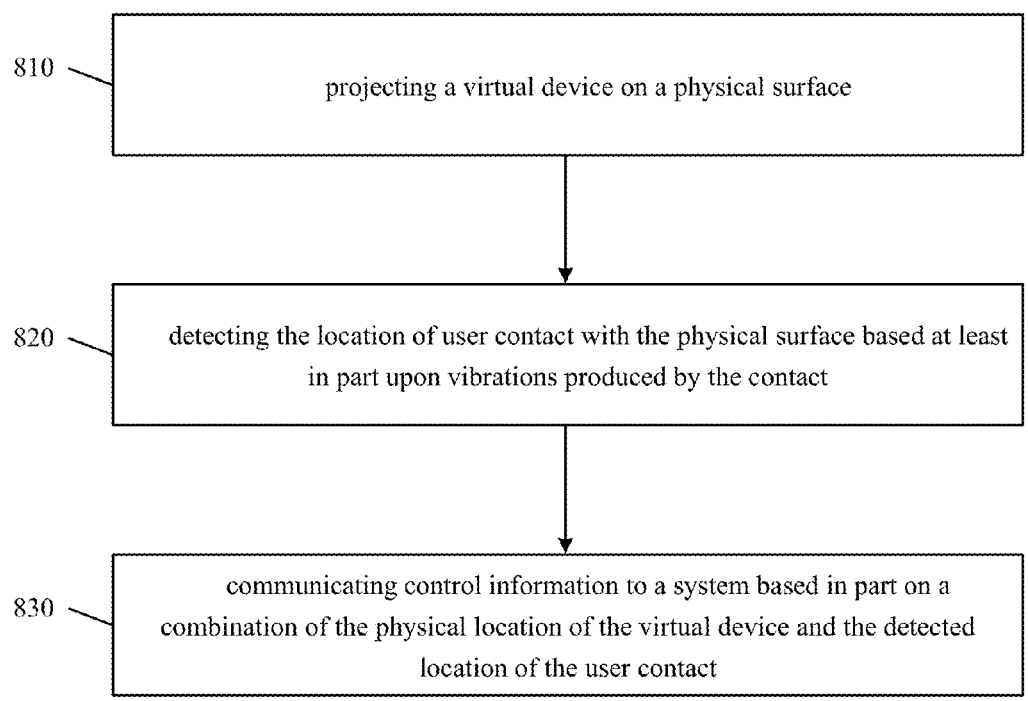
FIG. 8 shows a flowchart of one implementation of providing a virtual device experience.

FIG. 8 shows a flowchart 800 of one implementation of providing a virtual device experience. Flowchart 800 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 8. Multiple actions can be combined in some implementations. For convenience, this flowchart is described with reference to the system that carries out a method. The system is not necessarily part of the method.

At action 810, a virtual device is projected onto at least a portion of a surface. Projection can include an image or other visual representation of an object. For example, optional video projector 704 can project a page (e.g., virtual device 701) from a book onto a desk (e.g., surface portion 116) of a reader; thereby creating a virtual device experience of reading an actual book, or an electronic book on a physical e-reader, even though no book nor e-reader is present. Optional haptic projector 706 can project the feeling of the texture of the "virtual paper" of the book to the reader's finger. Optional audio projector 702 can project the sound of a page turning in response to detecting the reader making a swipe to turn the page.

At action 820, location information of a user contact with the surface is detected based at least in part upon vibrations produced by the contact. Contact can be detected via sensors 108, 110 and 120 using techniques such as discussed above with reference to FIGS. 4-5.

Location information can be determined from the contact using techniques such as discussed above with reference to FIG. 6.

At action 830, control information can be communicated to a system based in part on a combination of the location on the surface portion of the virtual device and the detected location information of the user contact. For example, control information such as a command to turn the page of a virtual book can be sent based upon detecting a swipe along the desk surface of the reader's finger. Many other physical or electronic objects, impressions, feelings, sensations and so forth can be projected onto a surface of medium 116 (or in proximity thereto) to augment the virtual device experience and applications are limited only by the imagination of the user.

Figure 9:
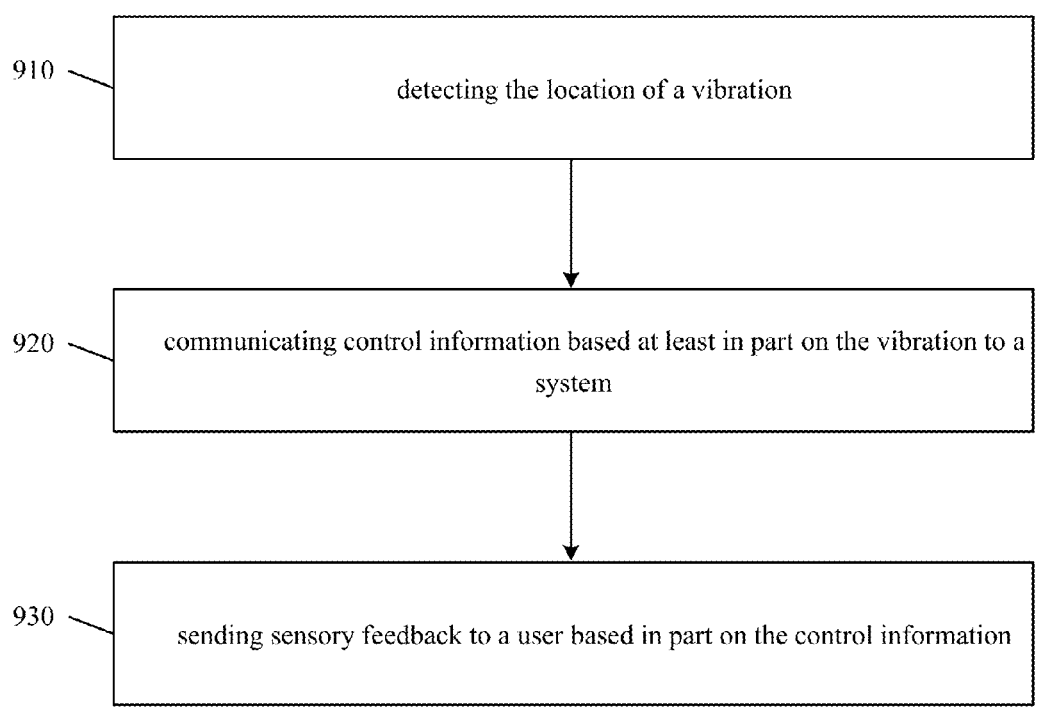
FIG. 9 shows a flowchart of one implementation of providing a virtual device experience.

FIG. 9 shows a flowchart 900 of one implementation of providing a virtual device experience. Flowchart 900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to the system that carries out a method. The system is not necessarily part of the method.

At action 910, a location of a vibration is detected.

At action 920, control information based at least in part on the vibration is communicated to a system.

At action 930, sensory feedback is sent to a user based in part on the control information.

Figure 10:
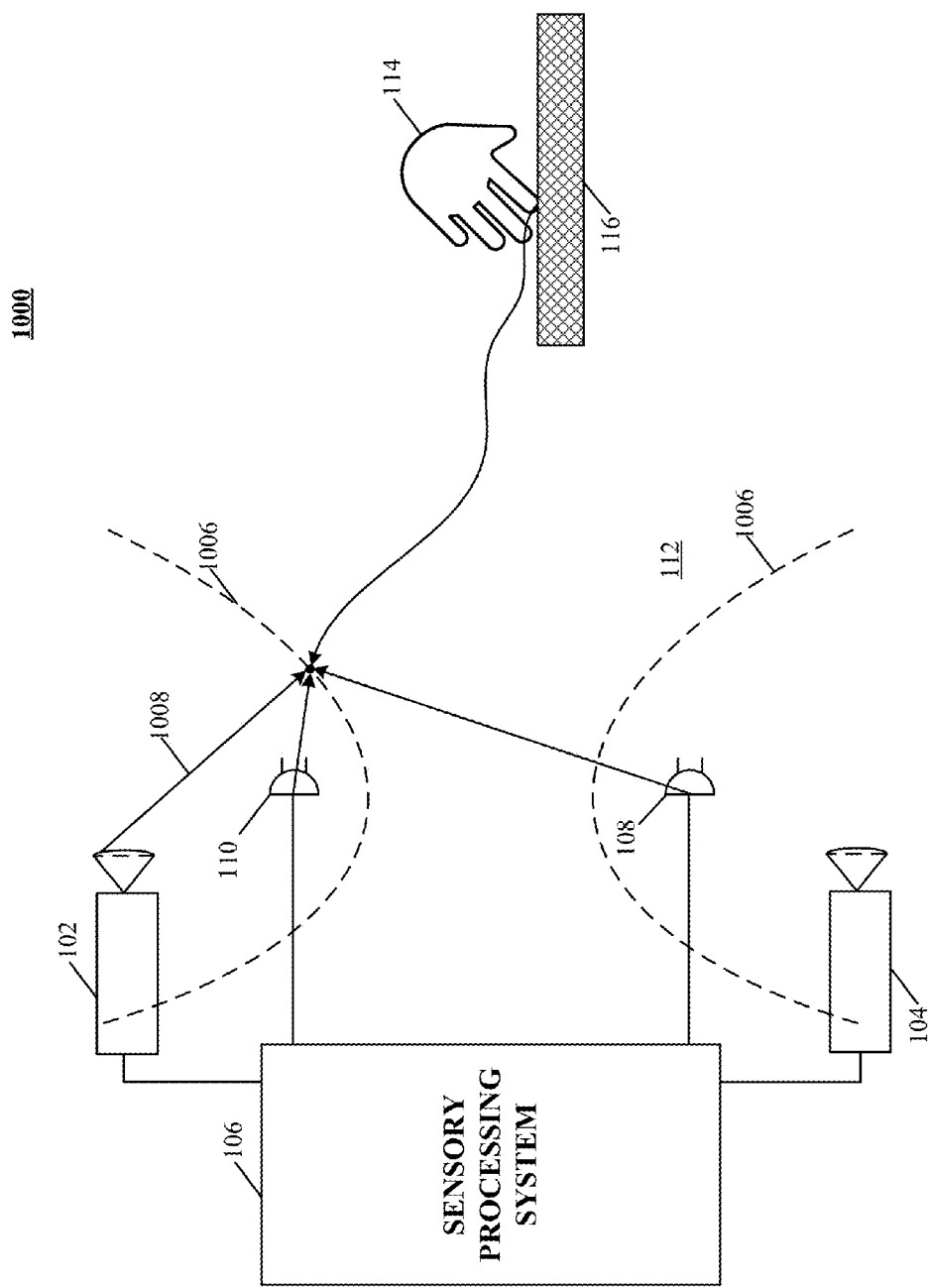
FIG. 10 illustrates one implementation of a system for measuring a time difference of arrival (TDOA) of the audio signals at contact vibrational sensors and mapping surface locations that satisfy the TDOA.

FIG. 10 illustrates one implementation of a system 1000 for measuring a time difference of arrival (TDOA) of the audio signals at contact microphones and mapping surface locations that satisfy the TDOA. In particular, when object 114 comes in contacts with a surface of medium 116, the resulting mechanical vibrations generate audio signals. These audio signals are detected by contact microphones 108 and 110 at difference times due the different distance of the microphones 108 and 110 from the object 114. The time difference information is then used to form a hyperbola 1006, with the contact microphones 108 and 110 as its foci. In one implementation, in the context of 3D space, the time difference information for a given pair of contact microphones can be used to construct a hyperboloid. Because every point on the hyperbola 1006 is a possible location of object 114, an optical signal 1008 from camera 102 is used to locate a unique position of object 114 at an intersection point between the optical signal 1008 and hyperbola 1006. This intersection point gives the position of object 114, as shown in FIG. 10.

Figure 11:
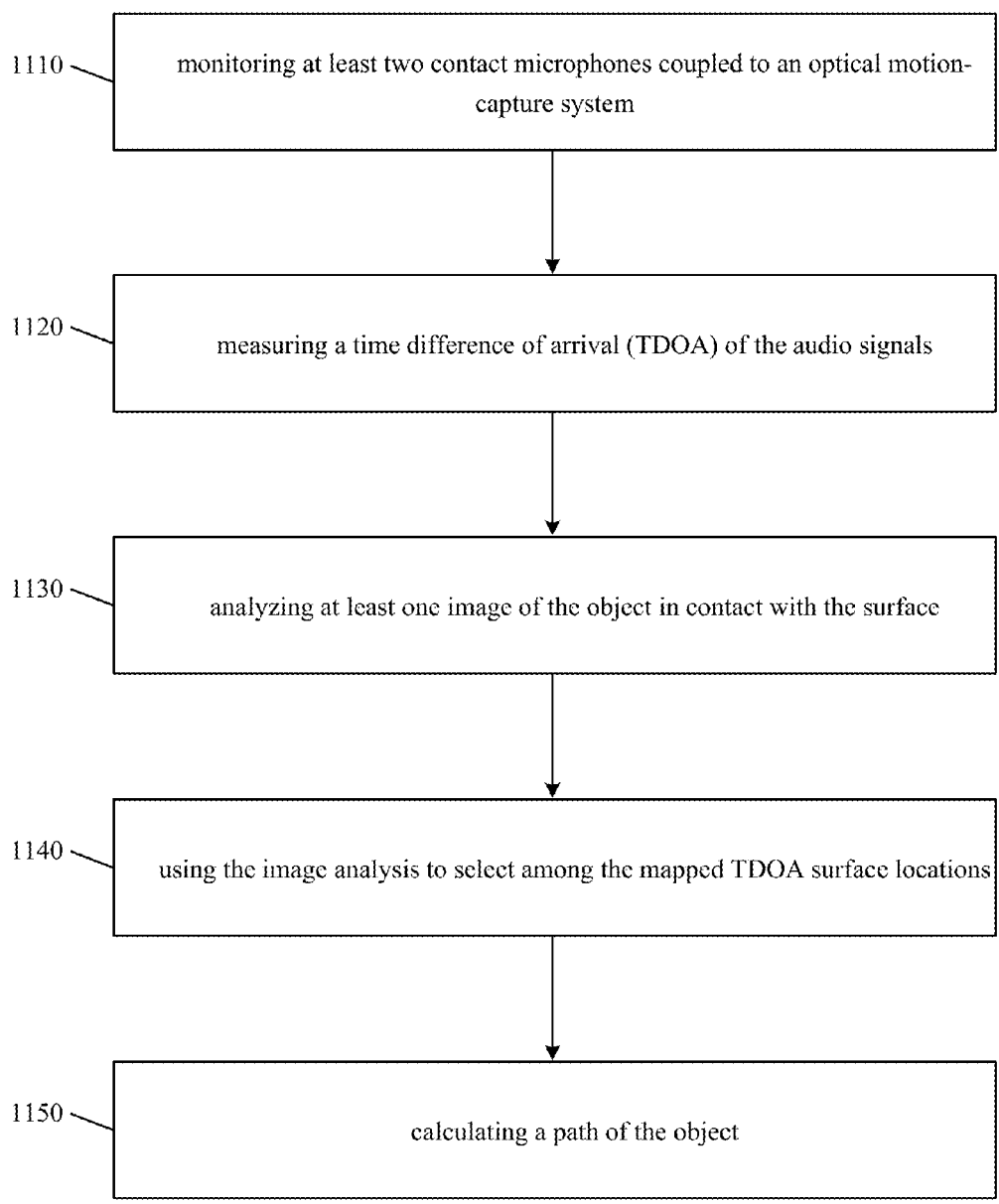
FIG. 11 shows a flowchart of one implementation of detecting and tracking an object with audio and optical signals.

FIG. 11 shows a flowchart 1100 of one implementation of detecting and tracking an object with audio and optical signals. Flowchart 1100 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations. For convenience, this flowchart is described with reference to the system that carries out a method. The system is not necessarily part of the method.

At action 1110, least two contact microphones, which are coupled to an optical motion-capture system and are in contact with a surface that a user touches, are monitored. In one implementation, the contact is a touch, tap, sequence of taps, or swiping motions of an object traveling across and in contact with a surface. In another implementation, the contact microphones are omnidirectional. In yet another implementation, the contact microphones are surface microphones.

At action 1120, a time difference of arrival (TDOA) of the audio signals at the contact microphones is measured and surface locations that satisfy the TDOA are mapped. These audio signals are detected by contact microphones at difference times due the different distance of the microphones from an object that generate the audio signals. In one implementation, the time difference information is used to form a hyperbola or hyperboloid for identifying a unique position of the object. In one implementation, an audio test signal is applied to the surface and a return signal received is by the contact microphone during application of the test signal. The return signal is then compared to stored signals associated with a plurality of media, a stored signal best that matches the return signal is selected, and the audio signals are filtered based on the selected stored signal.

At action 1130, at least one image, captured by a camera of the optical motion-capture system, of the object in contact with the surface is analyzed. In some implementations, any pixel in an image can be classified as an "object" pixel or a "background" pixel depending on whether that pixel contains a portion of object or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using the camera to capture images of the object and analyzing the images to detect object edges. Correlating object positions between images from the camera allows sensory processing system 106 to determine the location in 3D space of object, and analyzing sequences of images allows sensory processing system 106 to reconstruct 3D motion of object using motion algorithms.

At action 1140, image analysis is used to select among the mapped TDOA surface locations as a surface location of the contact. In one implementation, an optical signal from camera is used to locate a unique position of object at an intersection point between the optical signal and the hyperbola.

At action 1150, a path of the object is calculated by repeatedly measuring TDOAs of the audio signals at the contact microphones responsive to successive contacts of the object with the surface and analyzing a sequence of images of the successive contacts of the object with the surface.

Figure 12:
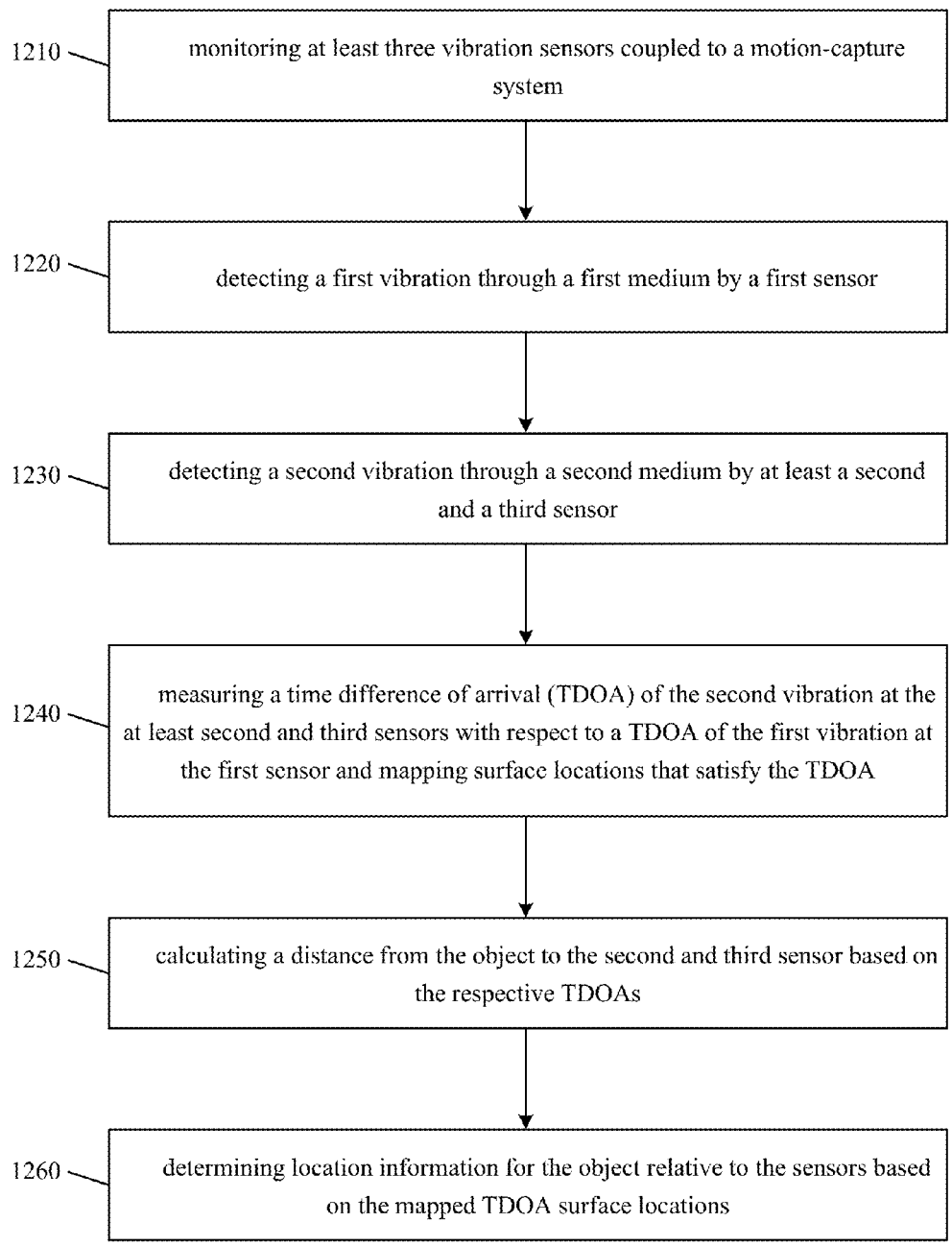
FIG. 12 illustrates a flowchart of operating a motion-capture system.

FIG. 12 shows a flowchart 1200 of one implementation of operating a motion-capture system. Flowchart 1200 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 12. Multiple actions can be combined in some implementations. For convenience, this flowchart is described with reference to the system that carries out a method. The system is not necessarily part of the method.

At action 1210, at least three vibration sensors coupled to a motion-capture system are monitored. In some implementations, in response to detection of vibrations generated by contact of an object with a surface of a solid medium, a position of the object is tracked. In one implementation, the contact is a touch, tap, sequence of taps, or swiping motions of an object traveling across and in contact with a surface. In another implementation, the vibration sensors are omnidirectional. In yet another implementation, the vibration sensors are surface sensors.

At action 1220, a first vibration through a first medium is detected by a first sensor. In one implementation, the first medium is a solid medium. In another implementation, the first medium is an air medium.

At action 1230, a second vibration through a second medium is detected by at least a second and a third sensor. The second vibration also results from the contact that produced the first vibration. In one implementation, the second medium is a solid medium. In another implementation, the second medium is an air medium.

At action 1240, a time difference of arrival (TDOA) of the second vibration is measured at the at least second and third sensors with respect to a TDOA of the first vibration at the first sensor and the surface locations that satisfy the TDOA are mapped. These vibrations are detected by vibration sensors at difference times due to the different distance of the vibration sensors from an object that generate the vibrations. In one implementation, the time difference information is used to form a hyperbola or hyperboloid for identifying a unique position of the object. In one implementation, a test vibration is applied to the surface and a return signal received is by the vibration sensor during application of the test vibration. The return vibration is then compared to stored signals associated with a plurality of media, a stored vibration that best matches the return vibration is selected, and the vibrations are filtered based on the selected stored signal.

At action 1250, a distance from the object to the second and third sensor is calculated based on the respective TDOAs. In one implementation, arrival of the first vibrational wave at the first sensor is used to measure a delay from which arrival of the subsequent waves as the second and third sensors is measured. The delay, and the velocity that the subsequent vibrational waves travel through the second medium, is used to compute distance information from the contact 605 to the sensor(s).

At action 1260, location information for the object relative to the sensors is determined based on the mapped TDOA surface locations. In one implementation, a triangulation technique is used.

Figure 13:
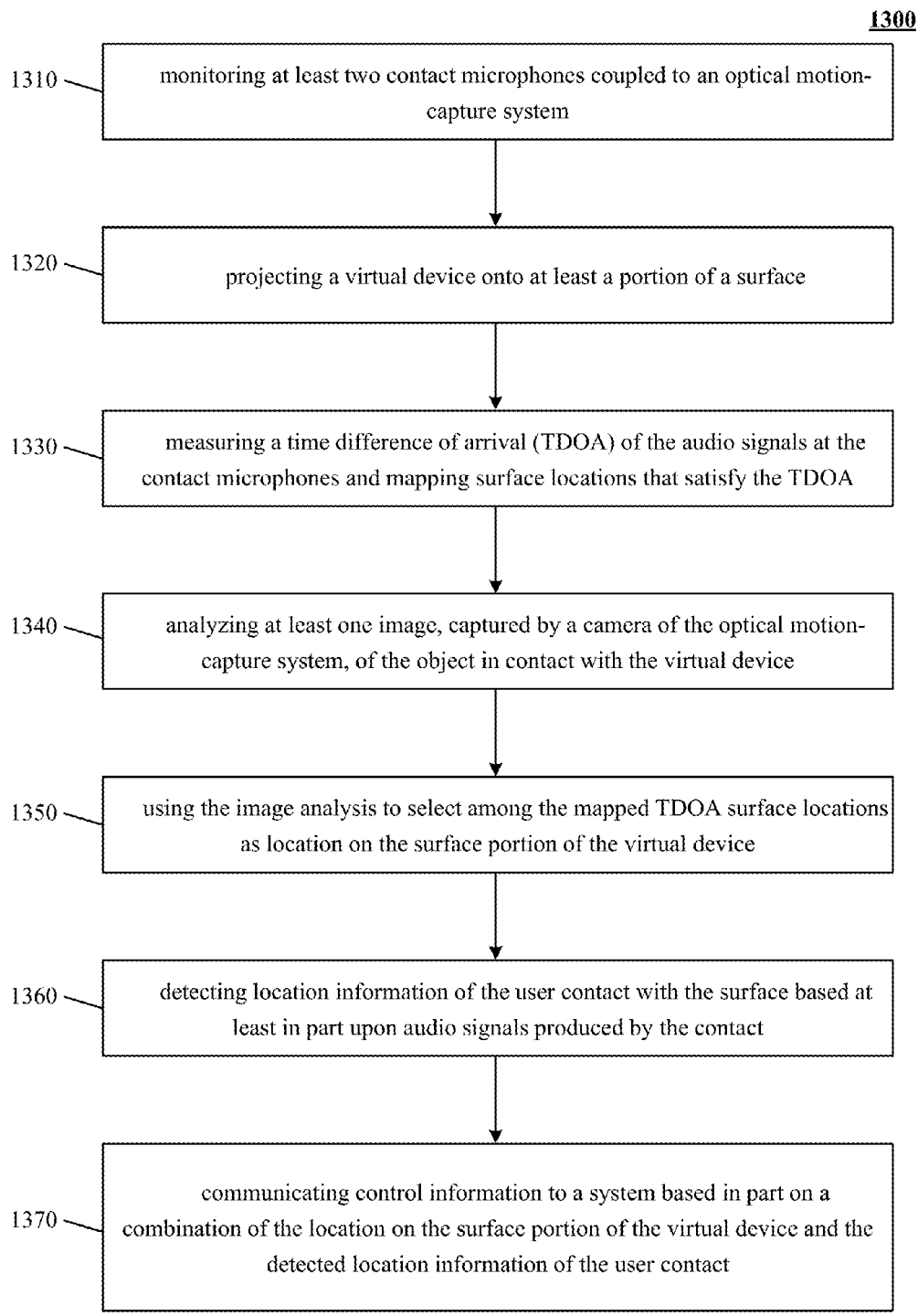
FIG. 13 depicts a method of creating a virtual device experience in a three-dimensional (3D) sensory environment.

FIG. 13 shows a flowchart 1300 of creating a virtual device experience in a three-dimensional (3D) sensory environment. Flowchart 1300 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 13. Multiple actions can be combined in some implementations. For convenience, this flowchart is described with reference to the system that carries out a method. The system is not necessarily part of the method.

At action 1310, least two contact microphones, which are coupled to an optical motion-capture system and are in contact with a surface that a user touches, are monitored. In one implementation, the contact is a touch, tap, sequence of taps, or swiping motions of an object traveling across and in contact with a surface. In another implementation, the contact microphones are omnidirectional. In yet another implementation, the contact microphones are surface microphones.

At action 1320, a virtual device is projected onto at least a portion of a surface.

At action 1330, a time difference of arrival (TDOA) of the audio signals at the contact microphones is measured and surface locations that satisfy the TDOA are mapped. These audio signals are detected by contact microphones at difference times due the different distance of the microphones from an object that generate the audio signals. In one implementation, the time difference information is used to form a hyperbola or hyperboloid for identifying a unique position of the object. In one implementation, an audio test signal is applied to the surface and a return signal received is by the contact microphone during application of the test signal. The return signal is then compared to stored signals associated with a plurality of media, a stored signal best that matches the return signal is selected, and the audio signals are filtered based on the selected stored signal.

At action 1340, at least one image, captured by a camera of the optical motion-capture system, of the object in contact with the surface is analyzed. In some implementations, any pixel in an image can be classified as an "object" pixel or a "background" pixel depending on whether that pixel contains a portion of object or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using the camera to capture images of the object and analyzing the images to detect object edges. Correlating object positions between images from the camera allows sensory processing system 106 to determine the location in 3D space of object, and analyzing sequences of images allows sensory processing system 106 to reconstruct 3D motion of object using motion algorithms.

At action 1350, image analysis is used to select among the mapped TDOA surface locations as a surface location of the contact. In one implementation, an optical signal from camera is used to locate a unique position of object at an intersection point between the optical signal and the hyperbola.

At action 1360, location information of the user contact with the surface is detected based at least in part upon audio signals produced by the contact.

At action 1370, control information is communicated to a system based in part on a combination of the location on the surface portion of the virtual device and the detected location information of the user contact.

Figure 14:
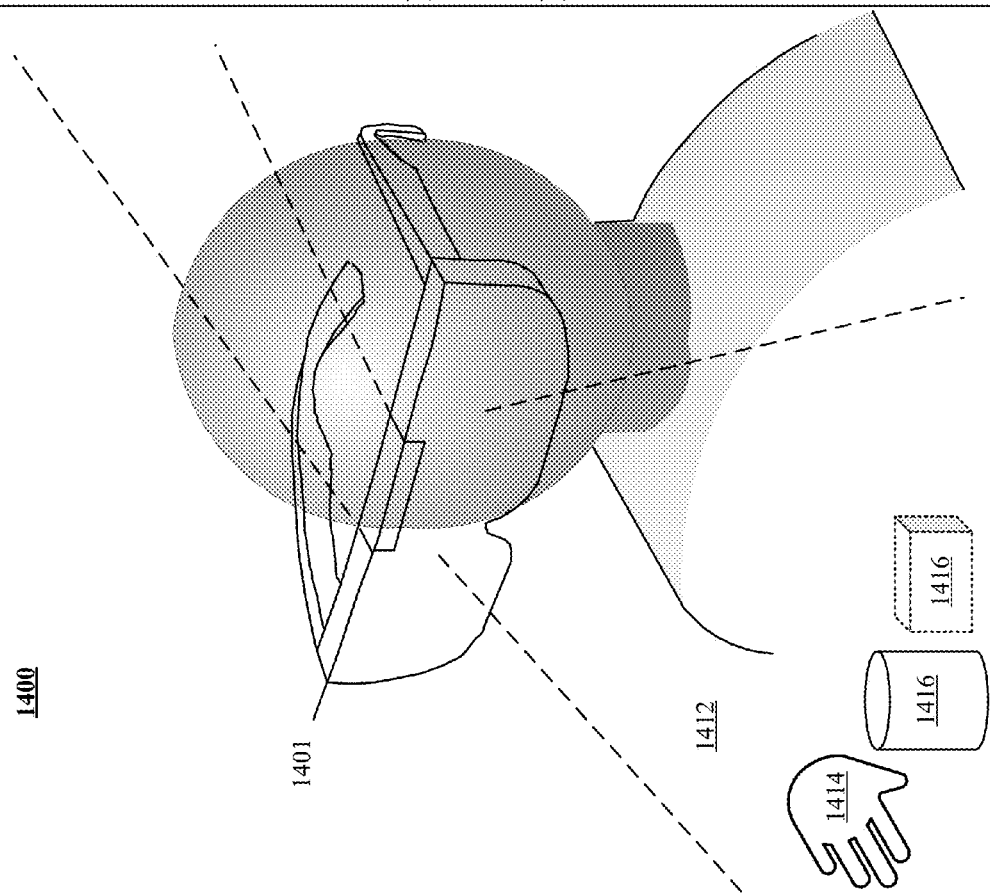
FIG. 14 illustrates a system for capturing image and other sensory data according to an implementation of the technology disclosed.

Referring to FIG. 14, which illustrates a system for capturing image data according to one implementation of the technology disclosed. System 1400 is preferably coupled to a wearable device 1401 that can be a personal head mounted display (HMD) having a goggle form factor such as shown in FIG. 14, a helmet form factor, or can be incorporated into or coupled with a watch, smartphone, or other type of portable device.

In various implementations, the system and method for capturing 3D motion of an object as described herein can be integrated with other applications, such as a head-mounted device or a mobile device. Referring again to FIG. 14, a head-mounted device 1401 can include an optical assembly that displays a surrounding environment or a virtual environment to the user; incorporation of the motion-capture system 1400 in the head-mounted device 1401 allows the user to interactively control the displayed environment. For example, a virtual environment can include virtual objects that can be manipulated by the user's hand gestures, which are tracked by the motion-capture system 1400. In one implementation, the motion-capture system 1400 integrated with the head-mounted device 1401 detects a position and shape of user's hand and projects it on the display of the head-mounted device 1400 such that the user can see her gestures and interactively control the objects in the virtual environment. This can be applied in, for example, gaming or internet browsing.

In one embodiment, information about the interaction with a virtual object can be shared by a first HMD user with a HMD of a second user. For instance, a team of surgeons can collaborate by sharing with each other virtual incisions to be performed on a patient. In some embodiments, this is achieved by sending to the second user the information about the virtual object, including primitive(s) indicating at least one of a type, size, and/or features and other information about the calculation point(s) used to detect the interaction. In other embodiments, this is achieved by sending to the second user information about the predictive model used to track the interaction.

System 1400 includes any number of cameras 102, 104 coupled to sensory processing system 106. Cameras 102, 104 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

As shown, cameras 102, 104 can be oriented toward portions of a region of interest 1412 by motion of the device 1401, in order to view a virtually rendered or virtually augmented view of the region of interest 1412 that can include a variety of virtual objects 1416 as well as contain an object of interest 1414 (in this example, one or more hands) moves within the region of interest 1412. One or more sensors 108, 110, 120 capture motions of the device 1401. In some implementations, one or more light sources 115, 117 are arranged to illuminate the region of interest 1412. In some implementations, one or more of the cameras 102, 104 are disposed opposite the motion to be detected, e.g., where the hand 1414 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Sensory processing system 106, which can be, e.g., a computer system, can control the operation of cameras 102, 104 to capture images of the region of interest 1412 and sensors 108, 110, 120 to capture motions of the device 1401. Information from sensors 108, 110, 120 can be applied to models of images taken by cameras 102, 104 to cancel out the effects of motions of the device 1401, providing greater accuracy to the virtual experience rendered by device 1401. Based on the captured images and motions of the device 1401, sensory processing system 106 determines the position and/or motion of object 1414.

For example, as an action in determining the motion of object 1414, sensory processing system 106 can determine which pixels of various images captured by cameras 102, 104 contain portions of object 1414. In some implementations, any pixel in an image can be classified as an "object" pixel or a "background" pixel depending on whether that pixel contains a portion of object 1414 or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using cameras to capture images of the object and analyzing the images to detect object edges. Correlating object positions between images from cameras 102, 104 and cancelling out captured motions of the device 1401 from sensors 108, 110, 120 allows sensory processing system 106 to determine the location in 3D space of object 1414, and analyzing sequences of images allows sensory processing system 106 to reconstruct 3D motion of object 1414 using conventional motion algorithms or other techniques. See, e.g., U.S. patent application Ser. No. 13/414,485 (filed on Mar. 7, 2012) and U.S. Provisional Patent Application Nos. 61/724,091 (filed on Nov. 8, 2012) and 61/587,554 (filed on Jan. 7, 2012), the entire disclosures of which are hereby incorporated by reference.

System 1400 employs projection techniques in conjunction with the sensory based tracking in order to present virtual (or virtualized real) objects (visual, audio, haptic, and so forth) created by applications loadable to, or in cooperative implementation with, the device 1401 to provide a user of the device with a personal virtual experience. Projection can include an image or other visual representation of an object.

One implementation uses motion sensors and/or other types of sensors coupled to a motion-capture system to monitor motions within a real environment. A virtual object integrated into an augmented rendering of a real environment can be projected to a user of a portable device 101. Motion information of a user body portion can be determined based at least in part upon sensory information received from imaging 102, 104 or acoustic or other sensory devices such as 108, 110, 120. Control information is communicated to a system based in part on a combination of the motion of the portable device 1401 and the detected motion of the user determined from the sensory information received from imaging 102, 104 or acoustic or other sensory devices such as 108, 110, 120. The virtual device experience can be augmented in some implementations by the addition of haptic, audio and/or other sensory information projectors. For example, an optional video projector can project an image of a page (e.g., virtual device) from a virtual book object superimposed upon a real world object, e.g., desk 1416 being displayed to a user via live video feed; thereby creating a virtual device experience of reading an actual book, or an electronic book on a physical e-reader, even though no book nor e-reader is present. Optional haptic projector can project the feeling of the texture of the "virtual paper" of the book to the reader's finger. Optional audio projector can project the sound of a page turning in response to detecting the reader making a swipe to turn the page. Because it is a virtual reality world, the back side of hand 1414 is projected to the user, so that the scene looks to the user as if the user is looking at the user's own hand(s).

A plurality of sensors 108, 110, 120 coupled to the sensory processing system 106 to capture motions of the device 1401. Sensors 108, 110, 120 can be any type of sensor useful for obtaining signals from various parameters of motion (acceleration, velocity, angular acceleration, angular velocity, position/locations); more generally, the term "motion detector" herein refers to any device (or combination of devices) capable of converting mechanical motion into an electrical signal. Such devices can include, alone or in various combinations, accelerometers, gyroscopes, and magnetometers, and are designed to sense motions through changes in orientation, magnetism or gravity. Many types of motion sensors exist and implementation alternatives vary widely.

The illustrated system 1400 can include any of various other sensors not shown in FIG. 14 for clarity, alone or in various combinations, to enhance the virtual experience provided to the user of device 1401. For example, in low-light situations where free-form gestures cannot be recognized optically with a sufficient degree of reliability, system 106 may switch to a touch mode in which touch gestures are recognized based on acoustic or vibrational sensors. Alternatively, system 106 may switch to the touch mode, or supplement image capture and processing with touch sensing, when signals from acoustic or vibrational sensors are sensed. In still another operational mode, a tap or touch gesture may act as a "wake up" signal to bring the image and audio analysis system 106 from a standby mode to an operational mode. For example, the system 106 may enter the standby mode if optical signals from the cameras 102, 104 are absent for longer than a threshold interval.

It will be appreciated that the figures shown in FIG. 14 are illustrative. In some implementations, it may be desirable to house the system 1400 in a differently shaped enclosure or integrated within a larger component or assembly. Furthermore, the number and type of image sensors, motion detectors, illumination sources, and so forth are shown schematically for the clarity, but neither the size nor the number is the same in all implementations.

While the disclosed technology has been described with respect to specific implementations, one skilled in the art will recognize that numerous modifications are possible. The number, types and arrangement of cameras and sensors can be varied. The cameras' capabilities, including frame rate, spatial resolution, and intensity resolution, can also be varied as desired. The sensors' capabilities, including sensitively levels and calibration, can also be varied as desired. Light sources are optional and can be operated in continuous or pulsed mode. The systems described herein provide images and audio signals to facilitate tracking movement of an object across a surface, and this information can be used for numerous purposes, of which position and/or motion detection is just one among many possibilities.

Threshold cutoffs and other specific criteria for distinguishing object from background can be adapted for particular hardware and particular environments. Frequency filters and other specific criteria for distinguishing audio signals from background noise can be adapted for particular microphones and particular surfaces. In some implementations, the system can be calibrated for a particular environment or surface medium, e.g., by adjusting frequency filters, threshold criteria, and so on.

Any type of object can be the subject of motion capture using these techniques, and various aspects of the implementation can be optimized for a particular object. For example, the type and positions of cameras and/or microphones can be selected based on the size of the object whose motion is to be captured, the space in which motion is to be captured, and/or the medium of the surface through which audio signals propagate. Analysis techniques in accordance with implementations of the technology disclosed can be implemented as algorithms in any suitable computer language and executed on programmable processors. Alternatively, some or all of the algorithms can be implemented in fixed-function logic circuits, and such circuits can be designed and fabricated using conventional or other tools.

Computer programs incorporating various features of the technology disclosed may be encoded on various computer readable storage media; suitable media include magnetic disk or tape, optical storage media such as compact disk (CD) or DVD (digital versatile disk), flash memory, and any other non-transitory medium capable of holding data in a computer-readable form. Computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Thus, although the disclosed technology has been described with respect to specific implementations, it will be appreciated that the technology disclosed is intended to cover all modifications and equivalents within the scope of the following claims.

What is claimed is:
1. A method of operating a motion-capture system, the method including:
monitoring at least three vibration sensors coupled to a motion-capture system; and
in response to detection of vibrations generated by contact of an object with a surface of a first medium, tracking a position of the object by:
detecting a first vibration through the first medium by a first vibration sensor;

detecting a second vibration through a second medium by at least a second and a third vibration sensor, wherein the first medium is different from the second medium;

measuring a time difference of arrival (TDOA) of the second vibration at the second and third vibration sensors with respect to the TDOA of the first vibration at the first vibration sensor and mapping surface locations that satisfy the TDOA, whereby the TDOA of the second vibration at the second and third vibration sensors differs with respect to the TDOA of the first vibration at the first vibration sensor because the second vibration travels through the second medium at a different velocity that the first vibration travels through the first medium;

calculating a distance from the object to the second and third vibration sensors based on the respective TDOAs; and determining location information for the object relative to the vibration sensors based on the mapped TDOA surface locations.

2. The method of claim 1, further including calculating a path of the object traveling across and in contact with the surface by:

repeatedly determining location information responsive to successive contacts of the object with the surface; and analyzing a sequence of images of the successive contacts of the object with the surface.

3. The method of claim 2, further including comparing the path to a plurality of path templates and identifying a template that best matches the path.

4. The method of claim 2, further including constructing a 3D model of the object and tracking movement thereof over the surface based on the sequence of images and the vibrations.

5. The method of claim 1, further including recognizing at least one of an image sequence or an audio signal that indicates a trajectory of the tracked object.

6. The method of claim 1, further including recognizing at least one of an image sequence or an audio signal that indicates a gesture of the tracked object.

7. The method of claim 1, further including:

projecting a virtual device onto at least a portion of the surface;

detecting location information of a user contact with the surface based at least in part upon vibrations produced by the contact; and communicating control information to a system based in part on a combination of the location on the surface portion of the virtual device and the detected location information of the user contact.

8. The method of claim 1, wherein the first medium is at least one of a solid medium or an air medium.

9. The method of claim 1, wherein the second medium is at least one of a solid medium or an air medium.

10. A motion-capture system, including:

at least three vibration sensors; and a control module comprising (i) an interface coupling to the at least three vibration sensors and operative to receive information indicating detection of vibrations generated by contact of an object with a surface of a first medium, (ii) a processor coupled to the interface and (iii) a non-transitory computer readable storage medium coupled to the processor and storing instructions, wherein the instructions when executed on the processors, implement actions comprising:

monitoring the at least three vibration sensors coupled to the control module; and in response to detection of vibrations generated by contact of an object with a surface of a first medium, tracking a position of the object by:

detecting a first vibration through the first medium by a first vibration sensor;

detecting a second vibration through a second medium by at least a second and a third vibration sensor, wherein the first medium is different from the second medium;

measuring a time difference of arrival (TDOA) of the second vibration at the second and third vibration sensors with respect to the TDOA of the first vibration at the first vibration sensor and mapping surface locations that satisfy the TDOA, whereby the TDOA of the second vibration at the second and third vibration sensors differs with respect to the TDOA of the first vibration at the first vibration sensor because the second vibration travels through the second medium at a different velocity that the first vibration travels through the first medium;

calculating a distance from the object to the second and third vibration sensors based on the respective TDOAs; and determining location information for the object relative to the vibration sensors based on the mapped TDOA surface locations.

11. The system of claim 10, further implementing calculating a path of the object traveling across and in contact with the surface by:

repeatedly determining location information responsive to successive contacts of the object with the surface; and analyzing a sequence of images of the successive contacts of the object with the surface.

12. The system of claim 11, further implementing comparing the path to a plurality of path templates and identifying a template that best matches the path.

13. The system of claim 11, further implementing constructing a 3D model of the object and tracking movement thereof over the surface based on the sequence of images and the vibrations.

14. The system of claim 10, further implementing recognizing at least one of an image sequence or an audio signal that indicates a trajectory of the tracked object.

15. The system of claim 10, further implementing recognizing at least one of an image sequence or an audio signal that indicates a gesture of the tracked object.

16. The system of claim 10, further implementing:

projecting a virtual device onto at least a portion of the surface;

detecting location information of a user contact with the surface based at least in part upon vibrations produced by the contact; and communicating control information to a system based in part on a combination of the location on the surface portion of the virtual device and the detected location information of the user contact.

17. The system of claim 10, wherein the first medium is at least one of a solid medium or an air medium.

18. The system of claim 10, wherein the second medium is at least one of a solid medium or an air medium.

19. A non-transitory computer readable storage medium impressed with computer program instructions to operate a motion-capture system, wherein the instructions, when executed on a processor, implement a method comprising:

monitoring at least three vibration sensors coupled to the motion-capture system; and in response to detection of vibrations generated by contact of an object with a surface of a first medium, tracking a position of the object by:

detecting a first vibration through the first medium by a first vibration sensor;

detecting a second vibration through a second medium by at least a second and a third vibration sensor, wherein the first medium is different from the second medium;

measuring a time difference of arrival (TDOA) of the second vibration at the second and third vibration sensors with respect to the TDOA of the first vibration at the first vibration sensor and mapping surface locations that satisfy the TDOA, whereby the TDOA of the second vibration at the second and third vibration sensors differs with respect to the TDOA of the first vibration at the first vibration sensor because the second vibration travels through the second medium at a different velocity that the first vibration travels through the first medium;

calculating a distance from the object to the second and third vibration sensors based on the respective TDOAs; and determining location information for the object relative to the vibration sensors based on the mapped TDOA surface locations.

\* \* \* \* \*